United States Patent
Hassan et al.

(10) Patent No.: US 11,966,572 B2
(45) Date of Patent: Apr. 23, 2024

(54) COMMENTING FEATURE FOR GRAPHIC DESIGN SYSTEMS

(71) Applicant: Figma, Inc., San Francisco, CA (US)

(72) Inventors: Ryhan Hassan, San Francisco, CA (US); Christa Simon, San Francisco, CA (US); Thomas John Pavlu, San Francisco, CA (US); Michael Harris, San Francisco, CA (US); Meagan Gamache, San Francisco, CA (US)

(73) Assignee: Figma, Inc., San Francisco, CA (US)

( * ) Notice: Subject to any disclaimer, the term of this patent is extended or adjusted under 35 U.S.C. 154(b) by 0 days.

(21) Appl. No.: 17/988,563

(22) Filed: Nov. 16, 2022

(65) Prior Publication Data

US 2023/0176718 A1 Jun. 8, 2023

Related U.S. Application Data

(60) Provisional application No. 63/280,140, filed on Nov. 16, 2021.

(51) Int. Cl.
 *G06F 3/04845* (2022.01)
(52) U.S. Cl.
 CPC ............... *G06F 3/04845* (2013.01)
(58) Field of Classification Search
 CPC .................. G06F 3/0484; G06F 3/0485
 See application file for complete search history.

(56) References Cited

U.S. PATENT DOCUMENTS

| | | | | |
|---|---|---|---|---|
| 6,088,709 A | * | 7/2000 | Watanabe | G06F 40/169 |
| | | | | 715/233 |
| 8,533,580 B1 | * | 9/2013 | Xu | G06F 16/957 |
| | | | | 715/208 |
| 9,430,229 B1 | | 8/2016 | Zijst | |
| 9,477,649 B1 | * | 10/2016 | Davidson | G06F 3/04845 |
| 10,129,188 B2 | * | 11/2018 | Liu | G06F 16/958 |
| 11,010,542 B2 | * | 5/2021 | Nelson | G06F 3/04842 |

(Continued)

FOREIGN PATENT DOCUMENTS

| | | |
|---|---|---|
| EP | 0576178 | 12/1993 |
| EP | 2775397 A2 | 9/2014 |

(Continued)

OTHER PUBLICATIONS

International Search Report and The Written Opinion of The International Searching Authority dated Jul. 1, 2022, for related PCT/US2022/025626, filed Apr. 20, 2022, 17 pages.

(Continued)

*Primary Examiner* — Linh K Pham
(74) *Attorney, Agent, or Firm* — Mahamedi IP Law LLP

(57) ABSTRACT

A computer system and method generates one or more commenting features on a canvas, wherein each commenting feature carries at least one comment from a given source. Each commenting feature can include a pin component and a comment body element. The pin component is associated with a corresponding location on the canvas. The computer system and method enable the user to move the comment body element about at least a region of the canvas to view the at least one comment from the given source, while rendering the pin component to coincide with the corresponding associated location of the canvas.

20 Claims, 14 Drawing Sheets

(56) References Cited

U.S. PATENT DOCUMENTS

| | | | |
|---|---|---|---|
| 2004/0054627 A1* | 3/2004 | Rutledge | G06Q 10/087 705/50 |
| 2007/0118794 A1* | 5/2007 | Hollander | G06F 16/954 715/205 |
| 2010/0037149 A1* | 2/2010 | Heath | G06F 3/0481 715/753 |
| 2010/0192107 A1 | 7/2010 | Takahashi | |
| 2011/0047532 A1* | 2/2011 | Wang | G06F 11/3676 717/130 |
| 2011/0268262 A1 | 11/2011 | Jones | |
| 2013/0013089 A1* | 1/2013 | Kawakami | H04N 21/8153 700/90 |
| 2013/0014023 A1* | 1/2013 | Lee | G06Q 10/101 715/751 |
| 2013/0031208 A1* | 1/2013 | Linton | G09B 7/02 709/217 |
| 2013/0097476 A1* | 4/2013 | Kuroda | G06F 40/169 715/201 |
| 2013/0124967 A1* | 5/2013 | Hatfield | G06T 11/60 715/233 |
| 2014/0108963 A1* | 4/2014 | Black | G06F 3/04845 715/753 |
| 2014/0258968 A1* | 9/2014 | Brown | G06Q 10/06 717/103 |
| 2014/0298153 A1* | 10/2014 | Tsujimoto | G06F 3/04845 715/232 |
| 2014/0310660 A1 | 10/2014 | Rosen | |
| 2015/0032366 A1* | 1/2015 | Man | G08G 1/096716 701/414 |
| 2015/0127753 A1 | 5/2015 | Tew | |
| 2015/0302338 A1* | 10/2015 | Zaveri | H04L 67/1001 705/7.39 |
| 2016/0110063 A1* | 4/2016 | Connolly | G06Q 30/0277 715/716 |
| 2016/0232785 A1* | 8/2016 | Wang | G08G 1/0129 |
| 2016/0343156 A1* | 11/2016 | Yoshizawa | G06T 11/60 |
| 2016/0358467 A1* | 12/2016 | Jeong | G08G 1/096791 |
| 2017/0109139 A1 | 4/2017 | Bitner | |
| 2017/0293544 A1* | 10/2017 | Katayama | G06F 11/2733 |
| 2017/0339370 A1 | 11/2017 | Inoue | |
| 2018/0121039 A1* | 5/2018 | Bliss | G06F 3/0482 |
| 2018/0173701 A1* | 6/2018 | Kim | G06F 3/04842 |
| 2018/0174446 A1* | 6/2018 | Wang | G08G 1/096716 |
| 2018/0285084 A1 | 10/2018 | Mimlitch, III | |
| 2018/0315248 A1* | 11/2018 | Bastov | G06T 19/20 |
| 2018/0337880 A1* | 11/2018 | Sokolov | H04N 21/00 |
| 2018/0350144 A1* | 12/2018 | Rathod | G06Q 20/3224 |
| 2019/0129927 A1* | 5/2019 | Okamoto | G06F 3/14 |
| 2019/0236975 A1 | 8/2019 | Chong | |
| 2019/0303880 A1 | 10/2019 | Hashimoto | |
| 2020/0296147 A1 | 9/2020 | Eliason | |
| 2022/0108276 A1 | 4/2022 | Stringham | |
| 2022/0191594 A1* | 6/2022 | Devoy, III | G06Q 20/384 |
| 2022/0263675 A1 | 8/2022 | Cupala | |
| 2022/0334704 A1 | 10/2022 | Lin | |
| 2022/0334806 A1 | 10/2022 | Lin | |

FOREIGN PATENT DOCUMENTS

| | | |
|---|---|---|
| EP | 3293619 | 3/2018 |
| EP | 3633472 A1 | 4/2020 |
| WO | WO-2009/132444 A1 | 11/2009 |
| WO | WO-2019/209391 A1 | 10/2019 |
| WO | WO-2021/097141 | 5/2021 |
| WO | WO-2021/159079 | 8/2021 |
| WO | WO-2022/061027 | 3/2022 |
| WO | WO-2022/109200 | 5/2022 |

OTHER PUBLICATIONS

Wallace Evan: "Multiplayer Editing in Figma", figma.com/blog, Sep. 28, 2016 (Sep. 28, 2016), XP055930547, Retrieved from the Internet: URL: https://www.figma.com/blog/multiplayer-editing-in-figma/ [retrieved on Jun. 13, 2022] the whole document, 7 pages.

Anonymous: "Change cursor into custom text", Dec. 24, 2018 (Dec. 24, 2018), XP055930588, Retrieved from the Internet: URL: https://stackoverflow.com/questions/53916492/change-cursor-into-custome-text [retrieved on Jun. 13, 2022] the whole document, 2 pages.

International Search Report and The Written Opinion of The International Searching Authority dated Jul. 25, 2022, for related PCT/US2022/025840 filed Apr. 20, 2022, 17 pages.

Paper by WeTransfer—Simple Sketch App, "Creativity at your fingertips" URL:https://web.archive.org/web/20220121205009/https://wetransfer.com/paper, 9 pages.

Zack Qattan, "Collaborative Cursor Chat w/Croquet", Nov. 30, 2020, youtube.com, https://www.youtube.com/watch?v=NiqTCROdlgw pp. 1-15 (Year: 2020).

International Search Report and The Written Opinion of The International Searching Authority dated Feb. 1, 2023, for related PCT/US2022/047191 filed Oct. 19, 2022, 16 pages.

International Search Report and The Written Opinion of The International Searching Authority dated Mar. 1, 2023 for related PCT/US2022/050134 filed Nov. 16, 2022, 10 pages.

Philippe Charles et al.: "Accelerating the creation of customized, language-specific IDEs in Eclipse", ACM SIGPLAN Notices, Association for Computing Machinery, US, vol. 44, No. 10, Oct. 25, 2009 (Oct. 25, 2009), pp. 191-206, XP058304685; ISSN: 0362-1340, DOI: 10.1145/1639949.1640104; p. 192, right-hand column, line 25-35, p. 196, right-hand column, line 6-13, abstract.

* cited by examiner

COMMENTING FEATURE FOR GRAPHIC DESIGN SYSTEMS

RELATED APPLICATIONS

This application claims benefit of priority to Provisional U.S. Patent Application No. 63/280,140, filed Nov. 16, 2021; the aforementioned priority application being hereby incorporated by reference in its entirety.

BACKGROUND OF THE INVENTION

Software design tools have many forms and applications. In the realm of application user interfaces, for example, software design tools require designers to blend functional aspects of a program with aesthetics and even legal requirements, resulting in a collection of pages which form the user interface of an application. For a given application, designers often have many objectives and requirements that are difficult to track.

In the field of graphic design, users often create detailed graphic designs that define, for example, the behavior of an application interface. The designs are formed on a canvas and can contain numerous design elements representing various functional and ornamental aspects of a user interface. In order to comment on a design aspect in a meaningful way, users typically need to position the comment near the part of the design that the comment pertains to. Under conventional approaches, users often provide comments for such graphic designs using text boxes which become part of the graphic design, and something the design user must manually remove before completion.

DETAILED DESCRIPTION

Figure 1A:
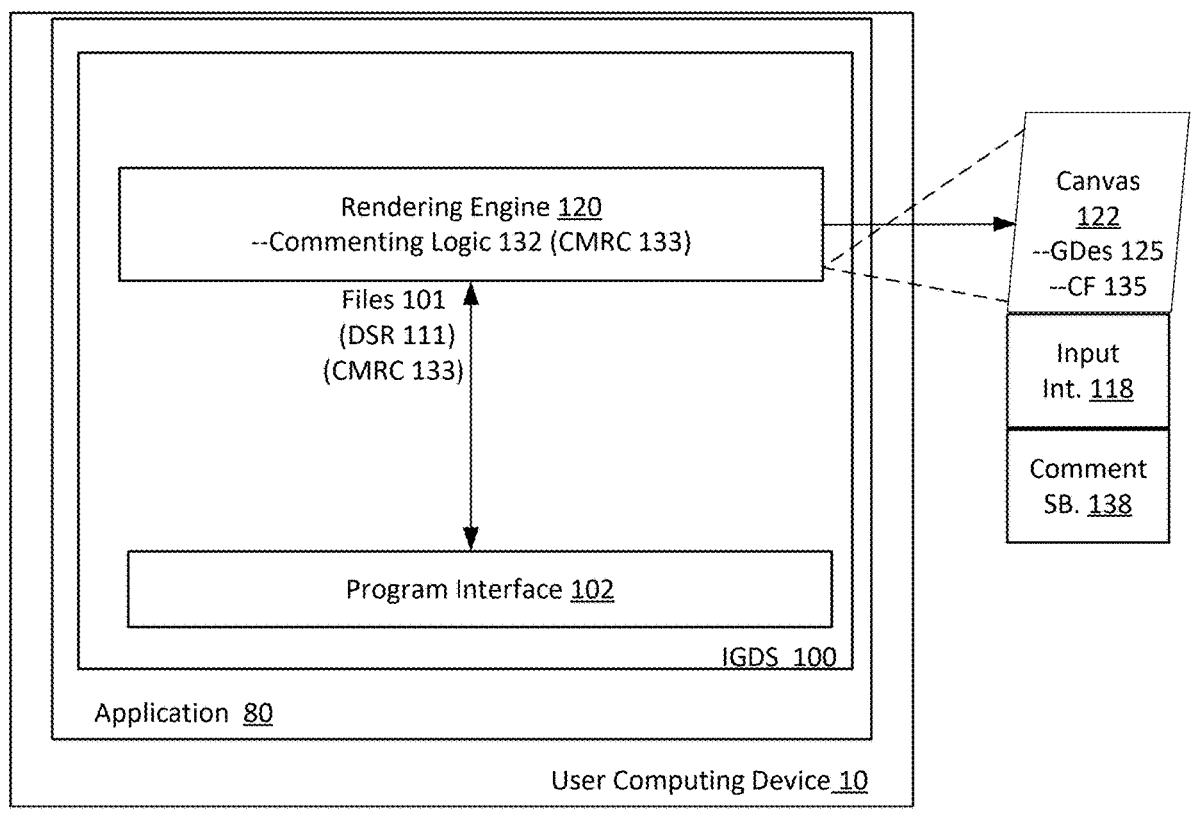
FIG. 1A illustrates an interactive graphic design system for a computing device of a user, according to one or more embodiments.

A computer system and method generates one or more commenting features on a canvas, wherein each commenting feature carries at least one comment from a given source. Each commenting feature can include a pin component and a comment body. The pin component is associated with a corresponding location on the canvas. The computer system and method enable the user to move the comment body about at least a region of the canvas to view the at least one comment from the given source, while rendering the pin component to coincide with the corresponding associated location of the canvas.

Among other technical advantages, embodiments such as described enable users to generate interactive and functional commenting features that can be linked to pin locations of the canvas, to enable reviewers to readily view the comment and the design element or aspect which the comment pertains to. Accordingly, in examples, a graphic design system is provided that can operate in at least a first mode where users can interact with commenting features and design elements of a graphic design at the same time. In some examples, a graphic design system is provided that can operate in additional modes, including in a second mode where all comments can be hidden. Moreover, in examples where commenting features are provided on a graphic design, commenting features can be represented by pin components that hide the commentary, thereby minimizing the presence of the commenting feature.

Embodiments further recognize that graphic designs are inherently cluttered. For example, in a collaborative environment, changes made to a graphic design by one user can be difficult to spot by another user. Embodiments provide for a graphic design system that displays commenting features as pin components, where comments are not visible, and visual aspects of the pin components are modulated to reflect changes pertaining to the commenting feature. For example, pin components for commenting features can be modulated to reflect the commenting feature is new, updated or unresolved. Such visual cues can inform the user where his attention may be required on the canvas.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, tablets, wearable electronic devices, laptop computers, printers, digital picture frames, network equipment (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

Graphic Design System

FIG. 1A illustrates an interactive graphic design system for a computing device of a user, according to one or more examples. An interactive graphic design system ("IGDS") 100 can be implemented in any one of multiple different computing environments. For example, in some variations, the IGDS 100 can be implemented as a client-side application that executes on the user computing device 10 to provide functionality as described with various examples. In other examples, such as described with FIG. 1B and FIG. 1C, the IGDS 100 can be implemented through use of a web-based application 80. As an addition or alternative, such as described with FIG. 1, the IGDS 100 can be implemented as a distributed system, such that processes described with various examples execute on a network computer (e.g., server) and on the user device 10.

According to examples, the IGDS 100 can be implemented on a user computing device 10 to enable a corresponding user to design various types of interfaces using graphical elements. The IGDS 100 can include processes that execute as or through a web-based application 80 that is installed on the computing device 10. As described by various examples, web-based application 80 can execute scripts, code and/or other logic (the "programmatic components") to implement functionality of the IGDS 100. Additionally, in some variations, the IGDS 100 can be implemented as part of a network service, where web-based application 80 communicates with one or more remote computers (e.g., server used for a network service) to executes processes of the IGDS 100.

In some examples, web-based application 80 retrieves some or all of the programmatic resources for implementing the IGDS 100 from a network site. As an addition or alternative, web-based application 80 can retrieve some or all of the programmatic resources from a local source (e.g., local memory residing with the computing device 10). The web-based application 80 may also access various types of data sets in providing the IGDS 100. The data sets can correspond to files and libraries, which can be stored remotely (e.g., on a server, in association with an account) or locally. The data sets can also include comment records and a comment record data store, as described below.

In examples, the web-based application 80 can correspond to a commercially available browser. In such examples, the processes of the IGDS 100 can be implemented as scripts and/or other embedded code which web-based application 80 downloads from a network site. For example, the web-based application 80 can execute code that is embedded within a webpage to implement processes of the IGDS 100. The web-based application 80 can also execute the scripts to retrieve other scripts and programmatic resources (e.g., libraries) from the network site and/or other local or remote locations. By way of example, the web-based application 80 may execute JAVASCRIPT embedded in an HTML resource (e.g., web-page structured in accordance with HTML 5.0 or other versions, as provided under standards published by W3C or WHATWG consortiums). In some examples, the rendering engine 120 and/or other components may utilize graphics processing unit (GPU) accelerated logic, such as provided through WebGL (Web Graphics Library) programs which execute Graphics Library Shader Language (GLSL) programs that execute on GPUs.

According to examples, user of computing device 10 operates web-based application 80 to access a network site, where programmatic resources are retrieved and executed to implement the IGDS 100. In this way, the user may initiate a session to implement the IGDS 100 for purpose of creating and/or editing a design interface. In examples, the IGDS 100 includes a program interface 102, an input interface 118, and a rendering engine 120. The program interface 102 can include one or more processes which execute to access and retrieve programmatic resources from local and/or remote sources.

In an implementation, the program interface 102 can generate, for example, a canvas 122, using programmatic resources which are associated with web-based application 80 (e.g., HTML 5.0 canvas). As an addition or variation, the program interface 102 can trigger or otherwise cause the canvas 122 to be generated using programmatic resources and data sets (e.g., canvas parameters) which are retrieved from local (e.g., memory) or remote sources (e.g., from network service).

The program interface 102 may also retrieve programmatic resources that include an application framework for use with canvas 122. The application framework can include data sets which define or configure, for example, a set of interactive graphic tools that integrate with the canvas 122 and which comprise the input interface 118, to enable the user to provide input for creating and/or editing a design interface.

According to some examples, the input interface 118 can be implemented as a functional layer that is integrated with the canvas 122 to detect and interpret user input. The input interface 118 can, for example, use a reference of the canvas 122 to identify a screen location of a user input (e.g., 'click'). Additionally, the input interface 118 can interpret an input action of the user based on the location of the detected input (e.g., whether the position of the input indicates selection of a tool, an object rendered on the canvas, or region of the canvas), the frequency of the detected input in a given time period (e.g., double-click), and/or the start and end position of an input or series of inputs (e.g., start and end position of a click and drag), as well as various other input types which the user can specify (e.g., right-click, screen-tap, etc.) through one or more input devices. In this manner, the input interface 118 can interpret, for example, a series of inputs as a design tool selection (e.g., shape selection based on location of input), as well as inputs to define attributes (e.g., dimensions) of a selected shape.

Additionally, the program interface 102 can be used to retrieve, from local or remote sources, programmatic resources and data sets which include files 101 which comprise an active workspace for the user. The retrieved data sets can include design elements which collectively form a graphic design 125 (or a design interface that is in progress). Each file 101 can include one or multiple DSR representation 111 (shown as "DSR 111") which collectively define graphic design 125. As described in more detail with some examples, the DSR representation 111 can include a document object model (DOM). The files 101 may also include additional data sets which are associated with the active workspace. For example, as described with some examples, the workspace file can store commenting records 133, which can be rendered as commenting features 135 by the rendering engine 120.

In examples, the rendering engine 120 uses the DSR representation 111 to render a corresponding graphic design 125 on the canvas 122, wherein the graphic design 125 reflects design elements and their respective attributes as provided with the individual pages of the files 101. The user can edit the graphic design 125 using the input interface 118. Alternatively, the rendering engine 120 can generate a blank page for the canvas 122, and the user can use the input interface 118 to generate the graphic design 125. As rendered, the graphic design 125 can include design elements such as a set of objects (e.g., shapes, text, images, programmatic elements), as well as attributes of the individual design elements. Each attribute of a design element can include an attribute type and an attribute value. For an object, the types of attributes include, shape, dimension (or size), layer, type, color, line thickness, text size, text color, font, and/or other visual characteristics. Depending on implementation, the attributes reflect properties of two- or three-dimensional designs. In this way, attribute values of individual objects can define, for example, visual characteristics of size, color, positioning, layering, and content, for elements that are rendered as part of the graphic design 125.

As described with some examples, the input interface 118 can also include tools for enabling a user to create, update, edit and/or resolve delete commenting features and records. Commenting features can correspond to interactive user-interface elements that are rendered on, or over (or with) the canvas 122, to carry and receive user-specified input. Each commenting feature can be based on or correspond to a comment record. Comment records can correspond to structured data sets which carry the user-specified comment, as well as other data sets, such as state values and source identifiers. The comment records that are associated or otherwise provided with a graphic design can be stored or maintained with a comment record store.

According to some examples, the rendering engine 120 executes commenting logic 132 to render interactive commenting features 135 on (or over) the canvas 122. Each commenting feature 135 can correspond to an interactive element that renders user-specified content, and can receive user input (e.g., text input, link, image, reaction, emoji, etc.). Each commenting feature 135 can correspond to a comment record 133, which can be stored with the associated files 101. The rendering engine 120 may also enable comment records 133 to be viewed separately in a structured or tabular format, such as in a comment sidebar 138 adjacent to the canvas 122. A user can interact with a design tool of the input interface 118 to create a commenting feature 135 and corresponding comment record 133. The rendering engine 120 can also implement the commenting logic 132 to enable the user to view and update individual comment records 133 through interaction with corresponding commenting features 135. Likewise, the rendering engine 120 can render the commenting feature 135 based on the comment record 133, and in accordance with one or more examples as described. With reference to an example of FIG. 1A, the rendering engine 120 can also implement the commenting logic 132 to retrieve commenting records 133 from a local data store, in order to render corresponding commenting features 135.

In examples, commenting features 135 can be pinned, linked or otherwise associated with a pin location. The pin location of a commenting feature can coincide with a particular design element (e.g., shaped design element), rendered on the canvas 122. In some implementations, when a commenting feature 135 is pinned to a design element, a reference to the commenting feature 135 (or corresponding record 133) can be generated and associated with a node identifier within the DSR representation 111 that identifies the pinned design element. Subsequently, when the design element is moved or resized, the comment feature can be automatically moved or repositioned to maintain a relative position (or spatial relationship) between the commenting feature 135 and pin location.

In examples, each comment record 133 includes a source identifier, one or more comments (e.g., text, image data, links or other content provided by a user), and/or metadata, where the metadata includes identifiers for authors or sources for the content of the comment, time stamps when individual content contributions were made to the comment record 133, and state information indicating whether the comment is resolved/unresolved, and/or viewed/unviewed. In some variations, individual comment records 133 can identify a canvas location data, which identifies a location on the canvas 122 which is to be associated with a particular comment. As described with examples, the location of the comment with respect to the canvas 122 can correspond to a canvas location (e.g., such as identified by X-Y coordinates), a region of the canvas, or a design element.

The rendering engine 120 can also implement commenting logic 132 to provide the comment sidebar 138 where comment records 133 can be created, updated and rendered. The user can also interact with the comment sidebar 138 to view, search, sort or filter the comment records 133. In some examples, the comment sidebar 138 is implemented as a modal feature that the user can select/toggle when providing input. The comment sidebar 138 can be toggled to enable the user to provide input that is designated for comments (or comment records 133).

As an addition or variation, the comment sidebar 138 is provided to enable the user to access and/or update comment records 133 while at the same time enabling the user to edit the graphic design 125. In some examples, the comment sidebar 138 can be implemented to have an operational mode, where information carried by individual comment records 133 can be viewed and acted upon by a user at the same time as the user is able to edit the graphic design 125.

In examples, the IGDS 100 operates to implement multiple modes, including a first mode where the user can view and interact with commenting features 135 as rendered on the canvas 122, while also interacting with the IGDS 100 to update and edit the graphic design 125. Further, additional interactive elements for enabling the user to create and edit commenting features 135 is also enabled. In this way, the user may have full access to the input interface 118 and functionality of the IGDS 100 (e.g., interactive design tools on sidebar, canvas tools, etc.), while also enabling the user to utilize the commenting functionality of the IGDS 100. Thus, for example, the user can interact with the graphic design 125 of the canvas to make edits or changes to the graphic design, while at the same time viewing and interacting with commenting features 135.

Still further, in examples, the IGDS 100 can be operated in alternative modes to facilitate use of commenting features. In examples, the rendering engine 120 can implement the commenting logic 132 to operate in a first mode, where users can create and interact with commenting features that are provided on the canvas 122. Further, the rendering engine 120 can be implemented in alternative modes, including in a second mode where commenting features are hidden, so as to un-cluster the graphic design 125. Still further, in alternative modes, the rendering engine 120 can be rendered to display commenting features that have a particular states, such as commenting features that are new (or updated) or unresolved.

Network Computing System to Implement IGDS

Figure 1B:
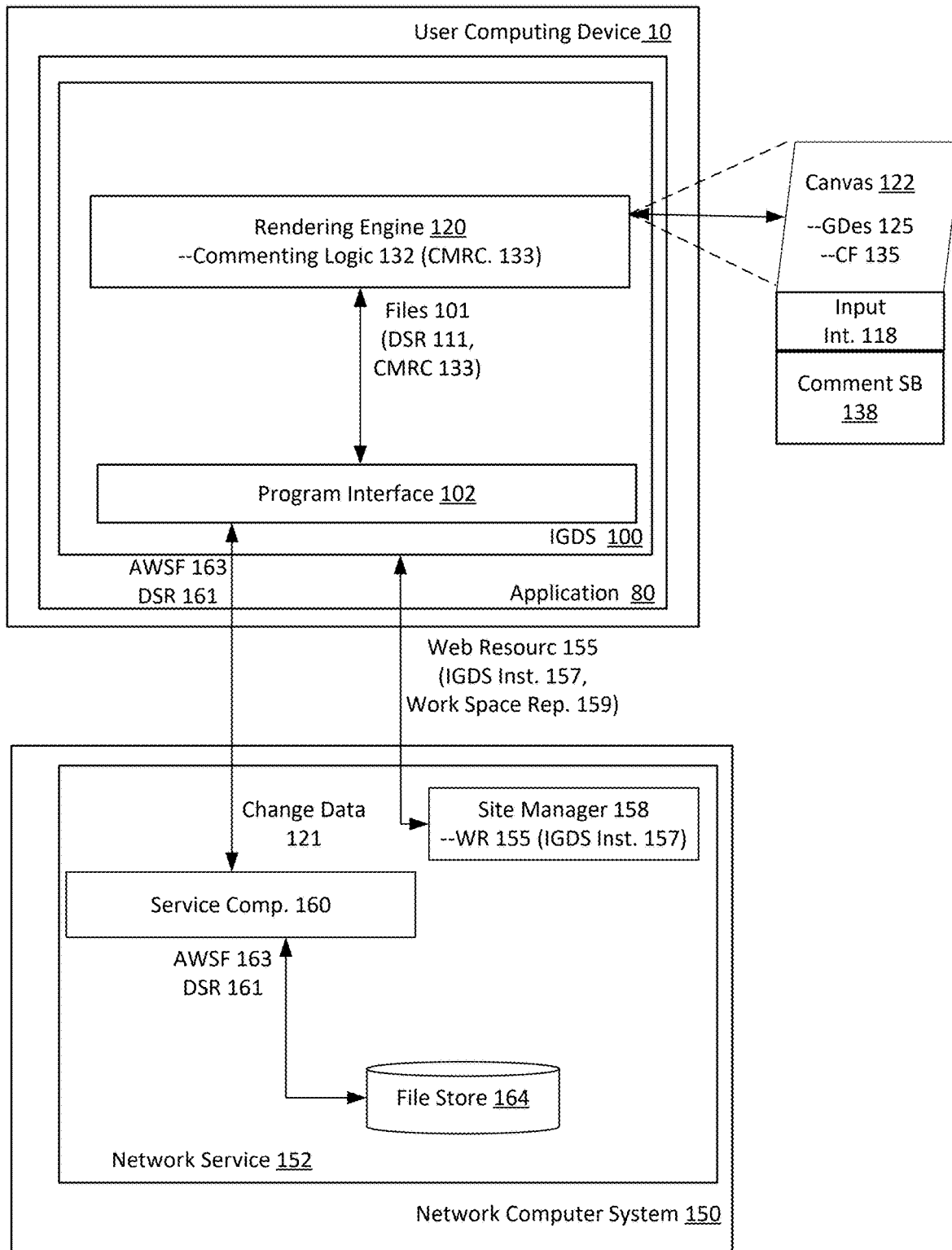
FIG. 1B illustrates a network computing system to implement an interactive graphic design system on a user computing device, according to one or more embodiments.

FIG. 1B illustrates a network computing system to implement an interactive graphic design system on a user computing device, according to one or more examples. A network computing system such as described with an example of FIG. 1B can be implemented using one or more servers which communicate with user computing devices over one or more networks.

In an example of FIG. 1B, the network computing system 150 performs operations to enable the IGDS 100 to be implemented on the user computing device 10. In variations, the network computing system 150 provides a network service 152 to support the use of the IGDS 100 by user computing devices that utilize browsers or other web-based applications. The network computing system 150 can include a site manager 158 to manage a website where a set of web-resources 155 (e.g., web page) are made available for site visitors. The web-resources 155 can include instructions, such as scripts or other logic ("IGDS instructions 157"), which are executable by browsers or web components of user computing devices.

In some variations, once the computing device 10 accesses and downloads the web-resources 155, web-based application 80 executes the IGDS instructions 157 to implement functionality such as described with some examples of FIG. 1A. For example, the IGDS instructions 157 can be executed by web-based application 80 to initiate the program interface 102 on the user computing device 10. The initiation of the program interface 102 may coincide with the establishment of, for example, a web-socket connection between the program interface 102 and a service component 160 of the network computing system 150.

In some examples, the web-resources 155 includes logic which web-based application 80 executes to initiate one or more processes of the program interface 102, causing the IGDS 100 to retrieve additional programmatic resources and data sets for implementing functionality as described by examples. The web resources 155 can, for example, embed logic (e.g., JAVASCRIPT code), including GPU accelerated logic, in an HTML page for download by computing devices of users. The program interface 102 can be triggered to retrieve additional programmatic resources and data sets from, for example, the network service 152, and/or from local resources of the computing device 10, in order to implement the IGDS 100. For example, some of the components of the IGDS 100 can be implemented through web-pages that can be downloaded onto the computing device 10 after authentication is performed, and/or once the user performs additional actions (e.g., download one or more pages of the workspace associated with the account identifier). Accordingly, in examples as described, the network computing system 150 can communicate the IGDS instructions 157 to the computing device 10 through a combination of network communications, including through downloading activity of web-based application 80, where the IGDS instructions 157 are received and executed by web-based application 80.

The computing device 10 can use web-based application 80 to access a website of the network service 152 to download the webpage or web resource. Upon accessing the website, web-based application 80 can automatically (e.g., through saved credentials) or through manual input, communicate an account identifier to the service component 160. In some examples, web-based application 80 can also communicate one or more additional identifiers that correlate to a user identifier.

Additionally, in some examples, the service component 160 can use the user or account identifier to retrieve profile information 109 from a user profile store 166. As an addition or variation, profile information 109 for the user can be determined and stored locally on the user's computing device 10.

The service component 160 can also retrieve the files of an active workspace ("active workspace files 163") that are linked to the user account or identifier from a file store 164. The profile store 166 can also identify the workspace that is identified with the account and/or user, and the file store 164 can store the data sets that comprise the workspace. The data sets stored with the file store 164 can include, for example, the pages of a workspace, data sets that identify constraints for an active set of workspace files, and one or more data structure representations 161 for the design under edit which is renderable from the respective active workspace files.

Additionally, in examples, the service component 160 provides a representation 159 of the workspace associated with the user to the web-based application 80, where the representation identifies, for examples, individual files associated with the user and/or user account. The workspace representation 159 can be in the form of, for example, a document object model (DOM) representation 111. The representation 159 can identify a set of files, where each file includes one or multiple pages, and each page including objects that are part of a design interface.

On the user device 10, the user can view the workspace representation through web-based application 80, and the user can elect to open a file of the workspace through web-based application 80. In examples, upon the user electing to open one of the active workspace files 163, web-based application 80 initiates the canvas 122. For example, the IGDS 100 can initiate an HTML 5.0 canvas as a component of web-based application 80, and the rendering engine 120 can access the DSR 111 of a graphic design 125, to render the corresponding graphic design 125 on the canvas 122.

In an example of FIG. 1B, the rendering engine 120 implements the commenting logic 132 to access and render comment records 133 and commenting features 135 as part of an online design environment. For example, the comment records 133 can be retrieved from, for example, a remote source (including third-party site), in order to render commenting features 135 with the graphic design 125.

Collaborative Network Platform

Figure 1C:
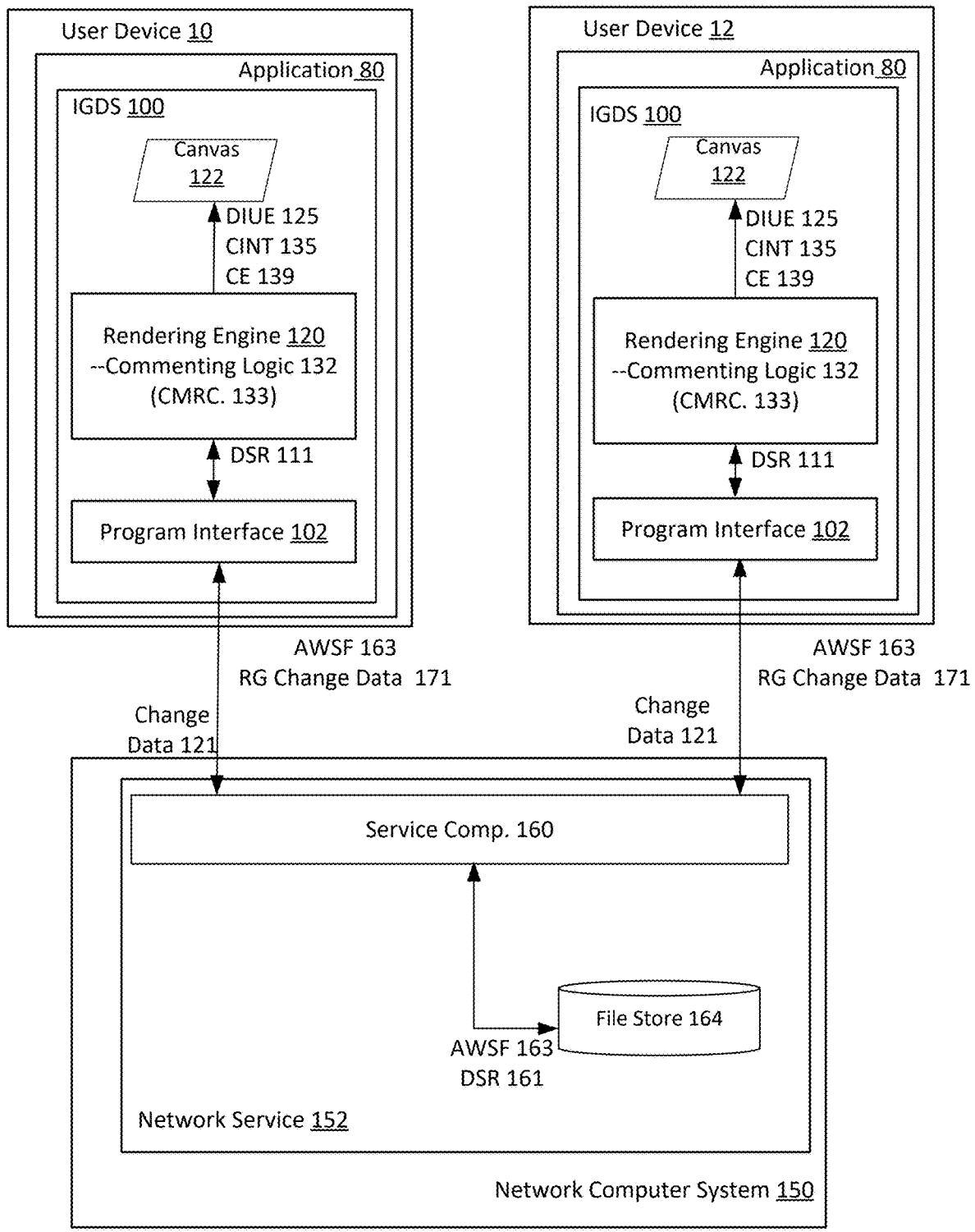
FIG. 1C illustrates a network computing system to implement an interactive graphic design system for multiple users in a collaborative environment, according to one or more embodiments.

FIG. 1C illustrates a network computing system to implement an interactive graphic design system for multiple users in a collaborative environment, according to one or more embodiments. In an example of FIG. 1C, a collaborative network platform is implemented by the network computing system 150, which communicates with multiple user computing devices 10, 12 over one or more networks (e.g., World Wide Web) to implement the IGDS 100 on each of multiple computing devices 10, 12. While FIG. 1C illustrates an example in which two users utilize the collaborative network platform, examples as described allow for the network computing system 150 to enable collaboration on design interfaces amongst a larger group of users.

With respect to FIG. 1C, the user computing devices 10, 12 can be assumed as being operated by users that are associated with a common account, with each user computing device 10, 12 implementing a corresponding IGDS 100 to access the same workspace during respective sessions that overlap with one another. Accordingly, each of the user computing devices 10, 12 may access the same set of active workspace files 163 at the same time, with the respective program interface 102 of the IGDS 100 on each user computing device 10, 12 operating to establish a corresponding communication channel (e.g., web socket connection) with the service component 160.

In examples, the service component 160 can communicate a copy of the active workspace files 163 to each user computing device 10, 12, such that the computing devices 10, 12 render the graphic design 125 of the active workspace files 163 at the same time. Additionally, each of the computing devices 10, 12 can maintain a local DSR representation 111 of the respective graphic design 125, as determined from the active workspace files 163. The service component 160 can also maintain a network-side data structure representation 161 obtained from the files of the active workspace 163, and coinciding with the local data structure representations 111 on each of the computing devices 10, 12.

The network computing system 150 can continuously synchronize the active workspace files 163 on each of the user computing devices. In particular, changes made by users to the graphic design 125 on one computing device 10, 12 may be immediately reflected on the graphic design 125 rendered on the other user computing device 10, 12. By way of example, the user of computing devices 10, 12 can make a change to the respective graphic design 125, and the respective rendering engine 120 can implement an update that is reflected in the local copy of the DSR representation 111. From the computing device 10, the program interface 102 of the IGDS 100 can stream change data 121, reflecting the change of the user input, to the service component 160. The service component 160 processes the change data 121 of the user computing device. The service component 160 can use the change data 121 to make a corresponding change to the network-side data structure representation 161. The service component 160 can also stream remotely-generated change data 171 (which in the example provided, corresponds or reflects change data 121 received from the user device 10) to the computing device 12, to cause the corresponding IGDS 100 to update the graphic design 125 as rendered on that device. The computing device 12 may also use the remotely generated change data 171 to update with the local data structure representation 111 of that computing device 12. The program interface 102 of the computing device 12 can receive the update from the network computing system 150, and the rendering engine 120 can update the graphic design 125 and the respective local copy of the DSR representation 111 of computing device 12.

The reverse process can also be implemented to update the data structure representations 161 of the network computing system 150 using change data 121 communicated from the second computing device 12 (e.g., corresponding to the user of the second computing device updating the graphic design 125 as rendered on the second computing device 12). In turn, the network computing system 150 can stream remotely generated change data 171 (which in the example provided, corresponds or reflects change data 121 received from the user device 12) to update the local DSR representation 111 of the graphic design 125 on the first computing device 10. In this way, the graphic design 125 of the first computing device 10 can be updated as a response to the user of the second computing device 12 providing user input to change the graphic design 125.

To facilitate the synchronization of the DSR representations 111, 111 on the computing devices 10, 12, the network computing system 150 implements a stream connector to merge the data streams which are exchanged between the first computing device 10 and the network computing system 150, and between the second computing device 12 and the network computing system 150. In some implementations, the stream connector can be implemented to enable each computing device 10, 12 to make changes to the network-side data representation 161, without added data replication that may otherwise be required to process the streams from each device separately.

Additionally, over time, one or both of the computing devices 10, 12 may become out-of-sync with the server-side data representation 161. In such cases, the respective computing device 10, 12 can redownload the active workspace files 163, to restart its maintenance of the data structure representation of the graphic design 125 that is rendered and edited on that device.

Synchronizing Commenting Features and Records

In some implementations, the rendering engine 120 implements commenting logic 132 to render commenting records 133 and features 135, and to synchronize creation/change of commenting records 133 and features 135 amongst collaborating users. For example, the commenting features 135 can be referenced in the DSR representations 111, along with design elements that comments are pinned to. Changes to the commenting features 135 (and corresponding commenting records 133) can be synchronized through synchronization by the DSR representations 111, as described with some examples.

With reference to an example of FIG. 1C, comment records 133 and features 135 can have multiple authors in a collaborative environment. For example, in an online collaborative session, multiple users may provide comments to a commenting feature 135 that is associated with a design element, and the users can generate and/or update comments carried by the commenting features. Each commenting record 133 and feature 135 can be used to carry a messaging thread that includes contributions by multiple users of the collaborative environment. In this way, each commenting feature 135 enables users to provide feedback and input while focusing their attention on a design element or specific portion of the canvas. In such examples, a series or sequence of comments can be structured as a thread. The rendering engine 120 can implement the commenting logic 132 to link or otherwise structure comment records 133 that are presumed or otherwise indicated as being part of a common thread (e.g., comment that is a reply to another comment). In some variations, comment threads can be implemented by updating individual comment records 133 to include comments from multiple users.

In a collaborative environment, the commenting features and corresponding comment records 133 can include state information (e.g., whether an associate, the comment record 133 has been "read"). Further, in some examples, some of the state information can be specific to individual users of a collaborative session. For example, the state information may be specific to the particular viewer, indicating whether that viewer has previously opened the commenting feature 135 or the corresponding record 133. As an addition or variation, the state information can indicate whether the commenting feature 135 and records 133 are resolved. In a collaborative environment, the variation in state data can be reflected by visually modulating the appearance of the commenting features (e.g., the pin component 408 (see FIG. 4A through FIG. 4J)). In this way, users can readily identify commenting features 135 that require user attention, where input is provided by another user.

Clustering of Commenting Features

With reference to FIG. 1A through FIG. 1C, the rendering engine 120 can implement commenting logic 132 to render commenting features 135 in clusters. In particular, examples provide for the commenting features 135 to be clustered when conditions are satisfied with respect to the associated pin locations of the commenting features 135 are deemed to overlap. When clustered, the rendering engine 120 can generate an alternative comment cluster element 139, where the comment cluster element 139 indicates information about underlying commenting features 135 and the associated commenting records 133. For example, the alternative cluster element 139 can include information such as the number of commenting features in the cluster, the number of unresolved or new comments in the cluster, the number of sources behind the clusters, and/or information about recently updated commenting features.

In examples, the determination that commenting features 135 are to be represented by a cluster element 139 can be based in part on the relative display positioning of the commenting features 135. The display positioning 139 can be based on the zoom level of the respective user computing device 10, 12. Accordingly, the determination that multiple commenting features 135 are to be represented by a cluster element 139 can be based on whether the positioning of commenting features 135 at a selected zoom level are separated by a display distance that is less than a threshold. In such case, multiple commenting features 138 are said to satisfy overlap conditions, and the rendering engine 120 represents the multiple commenting features 135 as a clustered element 139.

In examples, the overlap conditions can be based on a visual separation as between the pin locations of commenting features that are being clustered, where the visual separation reflects a screen distance. For example, if the visual separation between two or more commenting features 135 is less than a designated threshold, the rendering engine 120 renders the commenting features 135 as a cluster element 139. As the display area of each user computing device reflects a user-specific magnification parameter, the selection of comment features 135 for rendering in cluster form can be dynamically determined for individual users, based on the respective users magnification settings. Thus, the user's zoom level can dynamically vary a cluster element, including the number of commenting features 135 represented by the clustering element and/or the state information indicated by the clustering element 139. Similarly, the rendering engine 120 can dynamically eliminate the clustering element 139 when the zoom level is sufficiently magnified.

By way of illustration, for a given user that has "zoomed out", a given display region (e.g., threshold display area) may encompass a greater number of pin locations having associated comment records 133. In such a case, the rendering engine 120 can display the corresponding commenting features as a corresponding clustered element 139, where the commenting features 135 are displayed in a group on a display area of the canvas, at the selected zoom level.

Conversely, for another user that has "zoomed in", a given display region may encompass only one pin location that is associated with a commenting feature 135. In such a case, the portion of the canvas 122 can include a singular commenting feature 135.

Methodology

Figure 2:
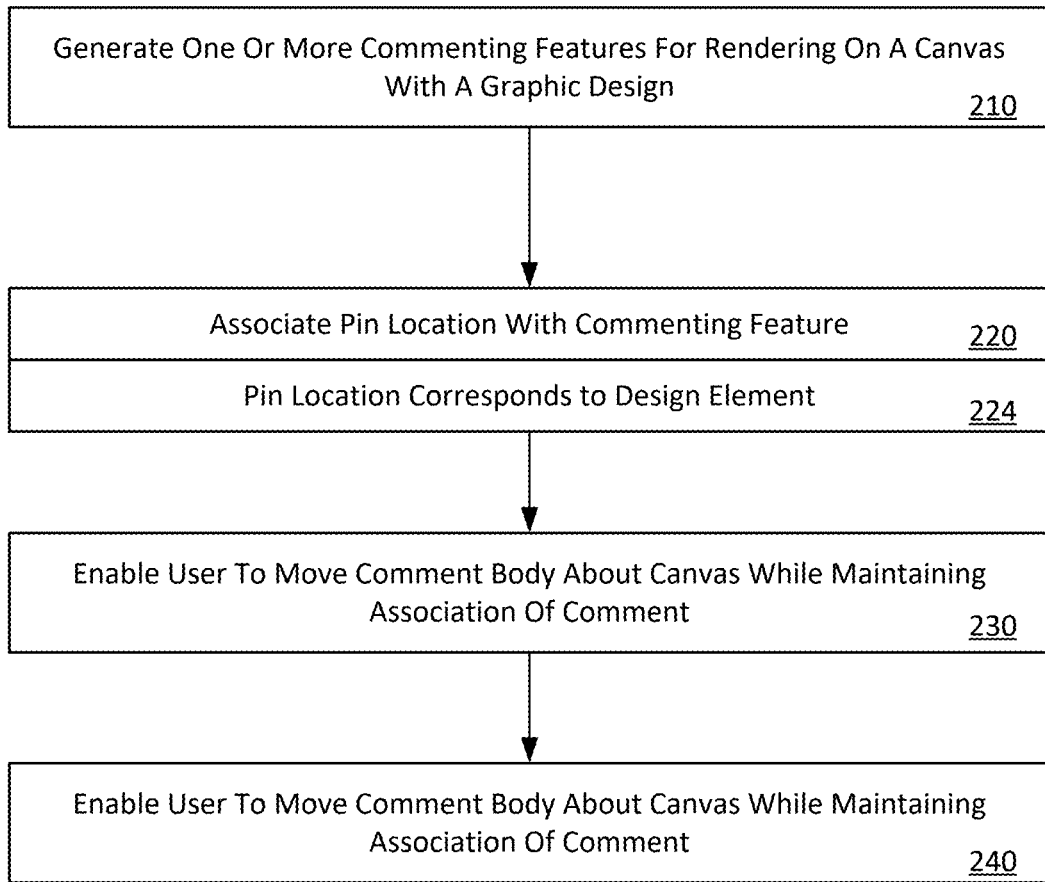
FIG. 2 illustrates an example method for creating commenting features for a graphic design, according to one or more embodiments.

FIG. 2 illustrates an example method for creating commenting features for a graphic design, according to one or more embodiments. A method such as described with an example of FIG. 2 can be implemented using a system such as described with examples of FIG. 1A through FIG. 1C. Accordingly, reference may be made to elements of FIG. 1A through FIG. 1C for purpose of illustrating components for implementing a step or sub-step being described. Additionally, in describing examples of FIG. 2, reference is made FIG. 4A through FIG. 4J for purpose of illustrating example commenting features, according to one or more embodiments.

With reference to FIG. 2, in step 210, the IGDS 100 generates one or more commenting features 410 for a graphic design 425, rendered on a canvas 402. Each commenting feature 410 can be generated by a user operating a corresponding computing device 10, 12. In a collaborative environment, users can view the graphic design 425 and comment on specific aspects of the graphic design (e.g., such as an attribute of a shaped element).

In step 220, the IGDS 100 associates, or otherwise links each commenting feature 410 to a pin location on the canvas 402. In examples, the pin location can correspond to a coordinate (or set of coordinates) on the canvas 402. In variations (see step 224), the pin location can correspond to a design element. Still further, the pin location can correspond to a region of the canvas 402 (e.g., see FIG. 4N).

As described with some examples, the renderable elements of a commenting feature 410 include a pin component 408 (see FIGS. 4A-4J) and a comment body element 418 (see FIG. 4A-4J). When the commenting feature 410 is created, the pin component 408 can be rendered on (or over) the canvas 402 at a location that is determined by the pin location.

In examples, step 224 can provide for the pin location to correspond to a design element. A user can provide input that specifies the pin location of a commenting feature 410 to be a shaped element. For example, the user can elect to insert a comment to provide feedback (e.g., for the designer) about a particular design element of the graphic design 425. The user can interact with the IGDS 100 to specify the particular design element (e.g., the user enters separate commands to select the shaped design element and create comment). In response, the IGDS 100 creates a new commenting feature 410 on the canvas 402, where the newly created commenting feature 410 is linked to the particular design element of the user input. Further, in examples, a pin component 408 can be rendered over or near a shaped element or frame that is linked to the commenting feature 410. As further described with examples, the comment body element 418 of the commenting feature 410 can be adjoined, hidden, or separated from the pin location, depending on implementation, setting or user input.

In step 230, the commenting feature 410 is rendered on the canvas 402 with the graphic design 425. In examples, the commenting feature 410 can be rendered in a closed state and an open state. In the closed state, the pin component 408 can be rendered on the canvas 402 without the comment body element 418. In the open state, the comment body element 418 can be rendered on the canvas 402 with the graphic design 425. In both open and closed states, examples provide for the pin component 408 to be rendered in a designated proximity or position relative to the linked design element 409.

In step 240, the IGDS 100 enables the user to manipulate the rendering includes enabling the user to manipulate one or more attributes of the linked design element 409 while maintaining a relative position of at least a portion of the commenting feature with respect to the shape element. In some examples, the pin component 408 of the commenting feature 410 can be moved or repositioned to maintain a positional relationship with respect to the linked design element. In some variations, the comment body element 418 can also be repositioned based on the design element 409 being moved or resized.

As an addition or alternative, the IGDS 100 can enable the user to interact with the commenting feature 410 (e.g., with the comment body element 418), while the user is able to update the graphic design 425 on the canvas 402. For example, the user can open and position (and reposition) the comment body element 418 over the canvas, while editing the graphic design 425 using tools and functionality of the IGDS 100. The interactions between the user and the comment body element 418 can include viewing, editing a comment, adding a new comment, reacting, interacting with an issue resolution feature (e.g., checkmark), dismissing the comment etc. In some examples, the IGDS 100 can include alternative modal implementations, incoming a comment-design mode where the user can interact with commenting features and with tools and functionality for updating the graphic design 425.

Commenting Component

Figure 3:
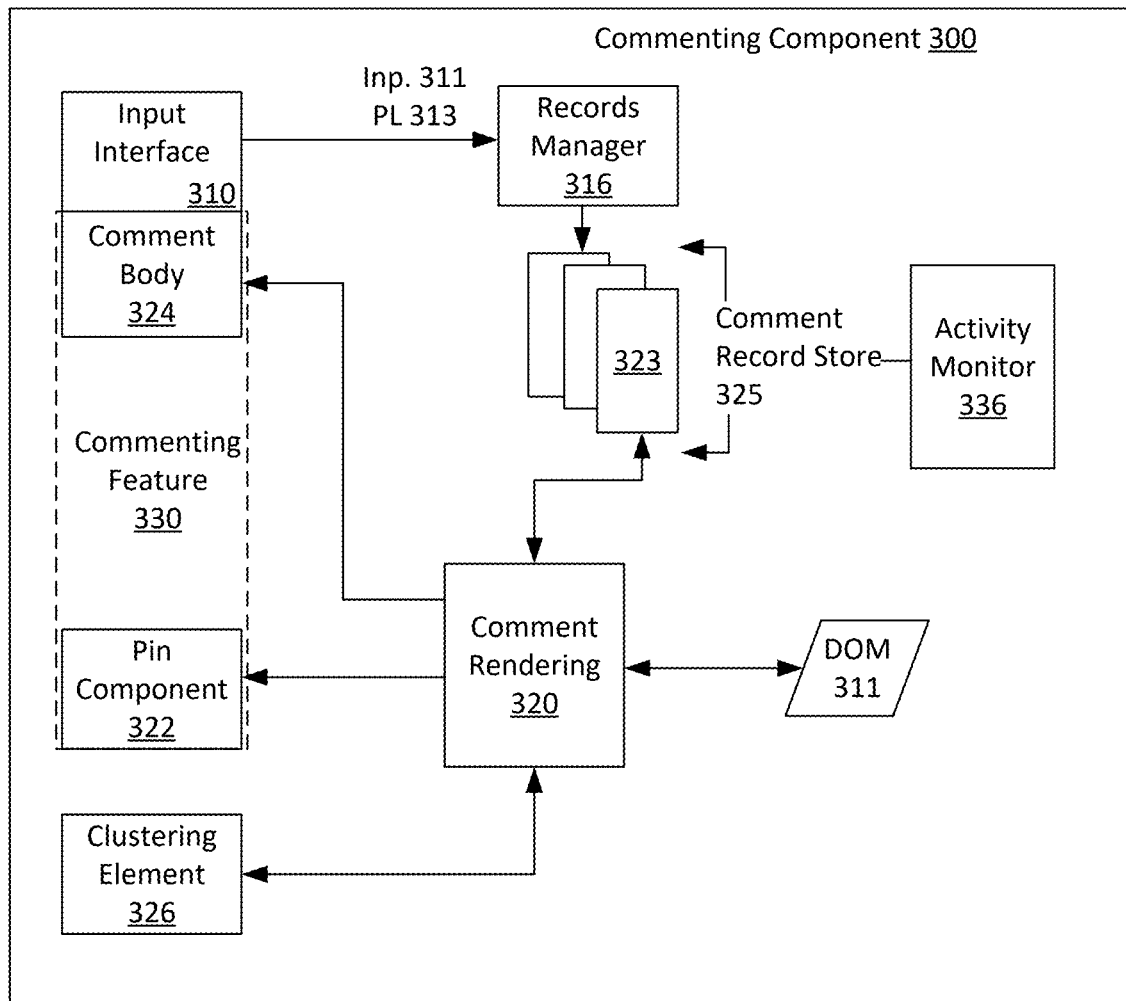
FIG. 3 illustrates a commenting component, according to one or more embodiments.

FIG. 3 illustrates a commenting component, according to one or more embodiments. A commenting component 300 such as described with an example of FIG. 3 can represent components and processes of IGDS 100 which implement commenting logic 132. Accordingly, in examples, commenting component 300 can be implemented by the rendering engine 120 (or another component of the IGDS 100) executing commenting logic 132, such as described in examples of FIG. 1A through FIG. 1C. Further, reference may be made to elements described with FIG. 4A through FIG. 4J for purpose of illustration.

With reference to FIG. 3, the commenting component 300 implements processes to provide one or multiple input interfaces 310 for enabling users to create and interact with commenting features 330 of a graphic design. As described with other examples, commenting features 330 include user-interactive features that carry and show comments—content entered by individual users—with respect to aspects of the rendered graphic design. Using an input interface 310, a user can create a new commenting feature 330 for a graphic design by specifying a corresponding input 311. Further, the input 311 can specify a pin location 313 for the comment. In some examples, the pin location 313 identifies a graphic element (e.g., shaped element, frame component, etc.), or a portion thereof. For example, a user can create a comment by selecting a shaped element rendered on canvas 122, and using a toolbar are dedicated input mechanism to create a new comment that is pinned to the shaped element. When the pin location 313 corresponds to a design element, the comment rendering 320 can map a selected location by the user with a design element, using, for example, a hierarchical representation of the graphic design 125. In some variations, the comment rendering 320 accesses a DOM representation to identify a top level node (e.g., top-most level node that is not a page node) that corresponds to the location specified by the input. Subsequently, when the design element of the pinned location is moved or resized on the canvas, the comment is similarly moved and repositioned.

As an addition or variation, the pin location 313 can specify a canvas location (e.g., X, Y coordinate recorded on canvas 122). As still another variation, the pin location can specify a region of the canvas 122, such as a region which encompasses multiple design elements.

New Comment Generation

In response to the new comment input 311, the commenting component 300 implements processes represented by record manager 316 to create a new comment record 323 that is stored in a comment record store 325, in association with the corresponding graphic design 125 rendered on the canvas 122. A comment record store 325 can represent a data structure that stores a comment record 323 for a newly created store. Additional commenting features 330 and corresponding records 325 can be created and rendered by one or multiple users (e.g., such as in a collaborative environment), resulting in multiple comment records 323 being stored with the comment record store 325. In this way, each rendered comment on the graphic design 125 can include a corresponding comment record 323 that is stored as part of the comment record store 325.

Further, in response to the new comment input 311, the comment rendering process 320 renders a new corresponding commenting feature 330 with the graphic design 125. As described with examples, the commenting feature 330 can be interactive, and positioned on or over the canvas 122 at a position that is based on the specified pin location 313. The comment records 323 can also be viewed through a dedicated commenting interface, separate from the canvas 122.

According to some examples, the commenting feature 330 is generated to include a pin element 322 and a comment body element 324. Depending on implementation, the pin element 322 can be positioned adjacent, near or over the pin location 313. For example, a set of positioning rules can be utilized to determine a position of the pin element 322 relative to the corresponding pin location 313 specified by the user input. For example, the pin element 322 can be spaced from the pin location 313 by either (i) a fixed or dynamic distance that is measured relative to the canvas 122 (e.g., number of pixels separating reference point of pin element 322 from the pin location 313); and/or (ii) a visual distance that may be dynamically determined based in part on a zoom level of the user.

In examples, the comment body element 324 is interactive and can form part of the input interface for that particular comment. An initial user can create the commenting feature 330, by specifying the pin location 313, and interacting with the comment body element 324 to provide input (e.g., comment, reactionary input, emoji, link, image, etc.). Subsequently, comment rendering 320 can render the commenting feature 330, with the comment body element 324 including the user-specified content. The comment body element 324 can be implemented as an element that can be rendered in a closed state, opened, and interacted with when opened. When a commenting feature is opened, other users can interact with, for example, the comment body element 324 to generate additional comments, respond to existing comments, react to comments (e.g., specify emoji) navigate comments (e.g., scroll or search within the comment body element 324) or perform other functions. Still further, in some implementations, the comment body element 324 can carry a thread of messages which users exchange.

Updating Comments

When implemented in a collaborative environment, multiple users can contribute to the content carried by the comment body element 324 of individual commenting features 330. The comment input interface 310 can include processes to detect interactions with the comment body element 324 of each commenting feature 330. When further interaction is detected, either by the original user who created the content, or by another user, the input interface 310 can update the corresponding comment record 323 to reflect the additional input. Further, comment rendering 320 can update the rendering of the commenting feature 330 where the input was received.

By way of illustration, a first user (e.g., reviewer) can generate a commenting feature to provide feedback for a particular design element or aspect of the graphic design. A second user (e.g., design user) can implement a feedback a suggestion conveyed through the comment body element 324 of the commenting feature 330. Alternatively, a second user (e.g., the design user or another reviewer) can respond to the feedback by providing his own content. In some variations, the commenting feature 330 can include a resolution input mechanism that allows any user to respond to a comment by indicating the issue raised by the comment has been resolved. Depending on implementation, issue resolution mechanism can correspond to, for example, a checkmark feature which the responding user can click to communicate resolution. As an addition or variation, the issue resolution mechanism can include a dismiss or question feature, or other shortcut inputs that specify a particular category of response.

Comment Activity Monitoring

In examples, the commenting component 300 can implement processes, represented by comment activity monitor 336, to track and convey information relating to events that occur with respect to each commenting feature 330 or record 323. The activity monitor 336 can record such event information for each commenting feature 330 with the corresponding comment record 323. In some examples, each comment record 323 can be associated with one or multiple state values that reflect different types of events which may occur with respect to a given comment.

In some examples, a comment (i.e., content entered by a user through the comment body element 324 of a commenting feature) can be categorized (e.g., by user input) or otherwise assumed to be an issue. Activity monitor 336 can identify an issue resolution state of the corresponding comment record 323 to be unresolved. When subsequent user input is received, by the same or different user, the issue resolution state can be changed in state to reflect resolution ("resolved"). In variations, the determination of whether the issue is resolved can be based on the type of input that is subsequently received. For example, a subsequent user can specify input that indicates the issue has been resolved. Alternatively, the determination of whether the issue has been resolved can be based in part on whether a user identified in the preceding comment subsequently provided input for the comment body element 324, and/or input of a particular type or kind (e.g., the user clicked a checkmark, or specified the term "resolved"). In cases where the comment body element 324 of a commenting feature 330 includes multiple comments, the activity monitor 336 can identify multiple issues for resolution. For example, the comment body element 324 can be structured to enable commenting users to specify or indicate their respective comments as being an issue. The activity monitor 336 can maintain an issue resolution state for each comment, or alternatively for a corresponding comment record 323 of each commenting feature 330. In the latter case, the comment record 323 can reflect an unresolved state when only one issue remains unresolved.

The comment rendering 320 can render commenting features 330 on the canvas in alternative view states. In some examples, comment rendering 320 renders commenting features 330 in closed and open states. In the closed state, the commenting feature 330 can appear as pin component 322, such that the comment body element 324 is either not visible, or minimized. A user can interact with the pin component 322 to open or view the comment body element 324. For example, the user can elect to preview the contents of the comment body element 324 (e.g., view-only mode), or open and interact with the comment body element 324 (e.g., enter a reply to a comment, react, check off to an existing comment, etc.).

Further, in examples, the commenting body element 324 can move, responsive to user input, while the commenting feature 330 is in the open state. In such examples, a user can move the commenting feature to a specific location on the canvas 122, without changing the pin location or moving the pin component 322. In such examples, a user can move the commenting body element 324 to a position on the canvas that is most convenient, such as immediately adjacent to a design element that is specified by the content of the comment body element 324. This allows the user to make an edit to the graphic while the user views the identified or relevant design elements of the comment.

Additionally, in some examples, the commenting component 300 can implement a comment-design mode, where comment rendering 320 enables the user to view and interact with the commenting features 330, while also enabling the user to edit or update the graphic design 125 on the canvas 122 at the same time. In the comment-design mode, the user may have full access to the design tools and functionality of the IGDS 100. Thus, the user can interact with the commenting feature 330 (e.g., open and view the comment body element 324, move the comment body element 324 about the canvas) while also enabling the user to make edits to the graphic design 125. In this way, the user's attention can remain on the canvas 122, at precise locations relating to work which may be identified by the comments of the commenting body element 324. In variations, the commenting component 300 can be toggled, so that comment rendering 320 hides the commenting features, enabling the user to view and edit/update the graphic design 125 without the commenting features cluttering their views of the graphic design 125.

In a collaborative environment, the commenting component 300 can be implemented in a mode that is specified by a given user. Thus, each user can implement a desired comment-design mode to collaborate on the graphic design 125.

Further, in some examples, when a new comment is generated, the corresponding comment record 323 can record a view state of the commenting feature 330. The activity monitor 336 can record when a user views the corresponding comment body element 324, in order to view and interact with one or more comments. The activity monitor 336 can update the view state of the comment record 323 to be, for example, viewed, reflecting that a user opening the comment body element 324. Further, the activity monitor 336 can record an identifier of the user that viewed the comment, such that the view state of the comment can be user specific. Once the user opens the comment body element 324, the activity monitor 336 can change the state associated with the comment to viewed. However, when another user adds to the comment of the comment body element 324, the activity monitor 336 can record the event by again changing the state of the comment record, to reflect that there is unviewed content with the commenting feature 330. Further, the corresponding comment record 323 can be updated to reflect the newly entered comment.

Still further, in some examples, the activity monitor 336 associates each comment record 323 with a user identifier of each user which provided a comment for the corresponding commenting feature. In some implementations, each user identifier is associated with a user profile, which can include a profile picture, name, or other identifier (nickname etc.).

Comment rendering 320 can render information to represent events which occur with respect to individual commenting features 330. Comment rendering 320 can selectively render each commenting feature 330 to indicate, for example, a source of each comment (e.g., the user or author that provided a comment), a number of comments (or alternatively unresolved comments) associated with each commenting feature, and/or an identifier of a last person that provided a comment (or an unresolved comment). By way of example, comment rendering 320 can render the commenting feature 330 to include a number, reflecting the number of commentators, comments and/or the number of unresolved issues. By way of example, the commenting feature 330 can render the pin component 322 and/or the comment body element 324 (in the closed state) to reflect a number of commentators, a number of unresolved issues, and/or a last issue. Further, comment rendering 320 can render the commenting feature 330 to reflect state information, such as whether the comments of the commenting feature or unresolved, or whether the comment body element 324 carries a new comment that is unviewed. When the comment body element 324 is opened, the various comments rendered with indicators of, for example, the source (or author) of the comment, a timestamp when the comment was entered and other information.

In examples, the comment rendering 320 can also generate cluster elements in place of commenting features, based on the zoom level and/or relative positioning of the commenting features 330 with respect to the display area. If commenting features 330 are deemed to be within a sufficient display distance from one another, the comment rendering 320 can generate a cluster element 326 in place of the clustered commenting features 330. To view the commenting features, the user can zoom in, or alternatively, select the clustering element to view its components. In some examples, the input interface 310 can also respond to view input that adjusts the zoom level by dynamically generating and adjusting a cluster element that reflects the number of commenting features 330 which are provided with the clustered element. Other information that can be provided can include, for example, information about the sources (e.g., authors) of the commenting features and the states of the commenting features, either individually or in aggregate.

Commenting Feature Examples

FIG. 4A through FIG. 4E illustrate example interfaces on which a commenting feature is rendered on a canvas, according to one or more embodiments. FIG. 4F through FIG. 4J illustrate an example interface on which another example commenting feature is provided, where the commenting feature includes content provided by multiple collaborating users, according to one or more embodiments. FIG. 4K illustrates implementation of a clustered commenting feature, according to one or more embodiments. FIG. 4L illustrates a comment sidebar which can be provided to render comments that appear in the canvas or in connection with the particular design, according to one or more embodiments. FIG. 4M illustrates a simulation (or "prototype") rendering of a graphic design under edit, along with the comment side bar, according to one or more embodiments. In describing examples of FIG. 4A through FIG. 4M, reference is made elements of FIG. 1A through FIG. 1C and FIG. 3, to illustrate suitable components for providing functionality as described.

Figure 4A:
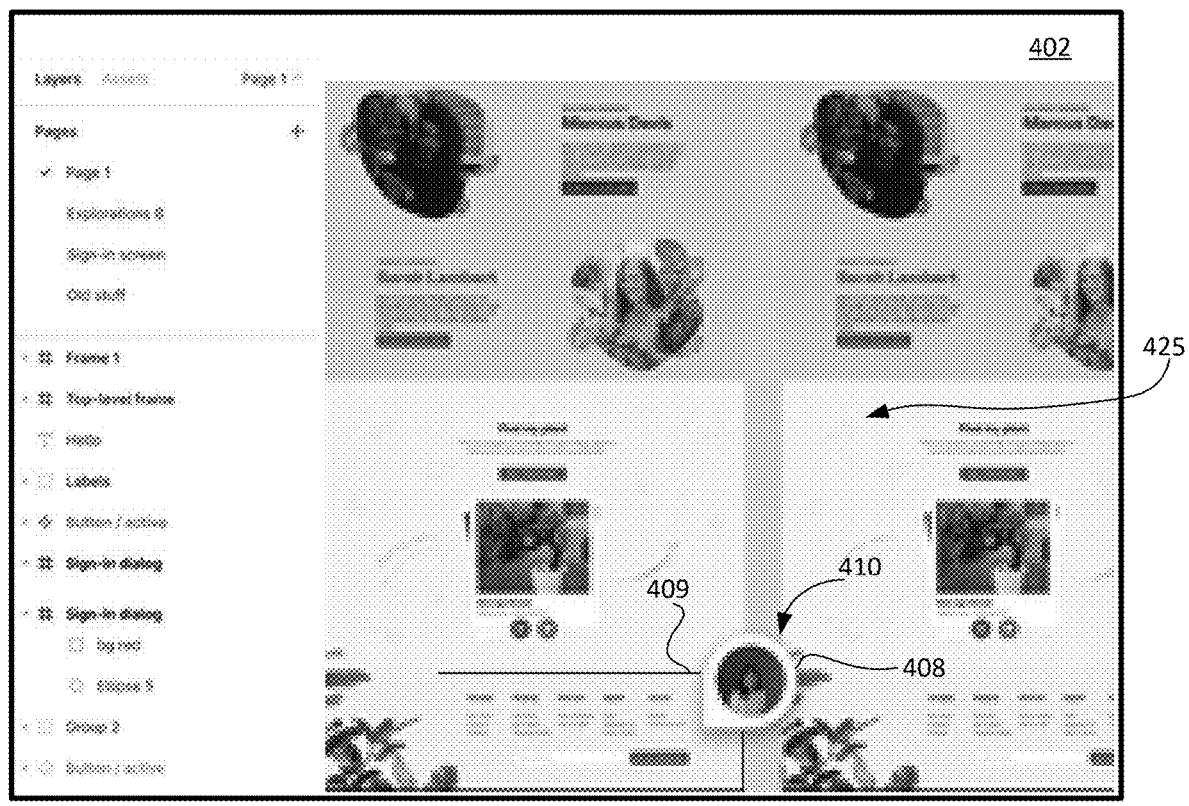
FIG. 4A through FIG. 4E illustrate example interfaces on which a commenting feature is rendered on a canvas, according to one or more embodiments.

With reference to FIG. 4A, an interface 400 includes a canvas 402 on which a graphic design 425 is provided. The graphic interface 425 can be created by one or more user operating computing devices 10, 12 that utilize an interactive graphic design system, such as described with FIG. 1A through FIG. 1C. In such collaborative environments, individual users operating computing devices 10, 12 can view and comment on aspects of the graphic design 425, by, for example, (i) creating a new commenting feature; and/or (ii) interacting with existing commenting feature(s) (including commenting features created by other users). The graphic design 425 can include multiple design elements (e.g., shaped elements), each with a corresponding set of attributes (e.g., text, filling, shape, etc.). In an example shown, a pin component 408 of the commenting feature 410 is provided on the canvas 402. The pin component 408 can be associated or linked with a pin location, such as design element 409. When the design element 409 is moved or resized, the pin component 408 can also be moved to maintain the relative position between the pin component 408 and the linked design element 409. Further, the pin component 408 indicates the presence of comments which the user can view. The pin component 408 can include attributes that indicate a source (or author) or other information about a comment carried by the commenting feature 410. In an example shown, the pin component 408 includes an avatar or other identifier of the comment carried by the commenting feature 410.

The interface 400 can include design tools (not shown) to enable the user to create and edit design elements, as well as commenting features. Further, as shown, the interface 400 can display a DSR representation 405 of the graphic design 425 where, in some examples, the commenting feature 410 is identified in association with a design element of the pin location.

Figure 4B:
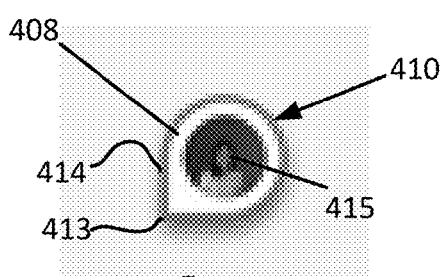

FIG. 4B illustrates an enlarged and isolated view of the pin component 408 of FIG. 4A. The pin component 408 of commenting feature 410 can be associated with a pin location (e.g., design element on the canvas 402), which may be specified (at least initially) by the commentator. The pin component 408 can be shaped to visually indicate the associated pin location of the commenting feature 410. For example, a corner 413 of the pin component 408 can be tapered or pointed to indicate a particular pin location. In some variations, the pin location of the pin component 408 can be moved by input from a collaborator.

In examples, the pin component 408 includes multiple configurable elements to indicate additional information about the commenting feature. For example, the pin component 408 can include a source identifier 415 (e.g., avatar), to indicate an author of a comment included with the commenting feature. As an addition or variation, the source identifier can represent an author of a most recent comment or of the oldest unread comment.

In a collaborative environment, some examples provide for the source indicator 415 can indicate visual identifiers (e.g., photo images, avatars) for one or multiple users that collaborate on a design that is rendered on the canvas 402. In this way, the source identifier 415 communicates to users an identifier as to the author or sources of the comments carried by the commenting feature 410. Additionally, the visual source indicator 415 can account for users that have replied to the content in the comment body element 418 (See FIG. 4C through FIG. 4E) of a specific commenting feature 410. In some implementations, the commenting feature 410 can carry comments (e.g., from multiple underlying records 133, from thread with comments from multiple users, etc.) from multiple users, in which case the pin component 408 can include a source identifier 415 that identifies multiple sources. For example, the source identifier 415 can identify a single commentator of commenting feature 410 using a corresponding user identifier (e.g., profile picture), or multiple commentators by displaying multiple identifiers, where each identifier represents a corresponding author of one of the comments carried in the comment body element 418. Still further, in other variations, the pin component 408 can include a number, to indicate a number of comments or sources of comments carried by the commenting feature 410.

Further, in examples shown, the pin component 408 can use highlighting, shading or other visual cues (e.g., modulating elements) to indicate state indicators, where state indicators indicate corresponding states of the commenting feature 410. The states of the commenting feature 410 can include, for example, a view state, resolution state and/or selection state. The view state can reflect whether the user has opened or previewed the comment body element of the commenting feature 410. The resolution state can reflect whether an issue raised by a comment carried with the commenting feature has been resolved. The selection state can correspond to whether the user has selected to view or preview the comment body of the commenting feature 410.

The state indicators, source indicator 415 and other indicators of the pin component 408 enable the user to view information about the commenting feature 410 (e.g., view state, resolution state, etc.), while the commenting feature 410 is maintained in a minimal state on the canvas 402. In the minimal state, for example, the commenting feature 410 is rendered without a comment body element 418 (see FIG. 4C through FIG. 4E). In some examples, the pin component 408 can provide a view state indicator 414 that is in the form of, for example, a ring, banner or other element integrated or associated with the pin component 408. In a collaborative implementation, the view state can be specific to individual users, meaning each user who views the canvas 402 is provided the commenting feature 410 with view state indicators that indicate whether the particular user previously opened, viewed, or read the corresponding comment body. In variations, the view state can indicator 414 can reflect a view state that is the same for all users of the canvas 402. In such case, when one user views previews or opens the comment body element 418 of the commenting feature 410, the view state indicator 414 changes for all users to reflect that the comment body element 418 was previously opened, viewed or read.

As an addition or variation, in examples, the view state indicator 414 can indicate whether the commenting feature 410 has been updated since the previous instance when the commenting feature was rendered as read or resolved. In some variations, a user's interaction with the commenting feature 410 may be reflected by the view state indicator 414, specifically as rendered on the interacting user's computing device. Thus, in a collaborative environment, the commenting feature 410 may be rendered on one user's computing device so that the view state indicator 414 reflects a read state, while it is rendered for other users in an unread state. While some examples provide for the view state indicator 414 to indicate a binary state value (viewed, unviewed), in variations, the view state indicator can indicate additional states, such as (i) an unresolved state, where for example, the user views and responds to the comment, and (ii) partially viewed state, where the view state indicator 414 indicates that one or more users who collaborate with the design have not viewed the content of the commenting feature.

In examples, as pertaining to the view state indicator 414, a user can provide one or multiple types of input to open, view or read the comment body 418 of commenting feature 410. A user can provide a first input (e.g., left click) to open the comment body element 418, resulting in the view state of the commenting feature 410 to reflect the commenting feature (or the underlying comment record represented by the commenting feature 410) as being "read". As an addition or variation, the user can provide a second input (right click) to render content from the comment body element 418, while maintaining or changing the view state of the commenting feature 410 to "unread".

In addition, the source indicator 415 of the commenting feature 410 can indicate a source of the comment record(s) 133 that is indicated by the commenting feature. In a collaborative environment, the source indicator 415 can indicate visual identifiers (e.g., photo images, avatars) for one or multiple users that collaborate on a design that is rendered on the canvas 402. In this way, the source identifier 415 communicates to users an identifier as to the author or sources of the comments carried by the commenting feature 410. Additionally, the visual source indicator 415 can account for users that have replied to the content in the comment body element 418 of a specific commenting feature 410. In some implementations, the commenting feature 410 can carry comments (e.g., from multiple underlying records 133, from thread with comments from multiple users, etc.) from multiple users, in which case the pin component 412 can include a source identifier 415 that identifies multiple sources. For example, the source identifier 415 can identify a single commentator of commenting feature 410 using a corresponding user identifier (e.g., profile picture), or multiple commentators by displaying multiple identifiers, where each identifier represents a corresponding author of one of the comments carried in the commenting feature.

Figure 4C:
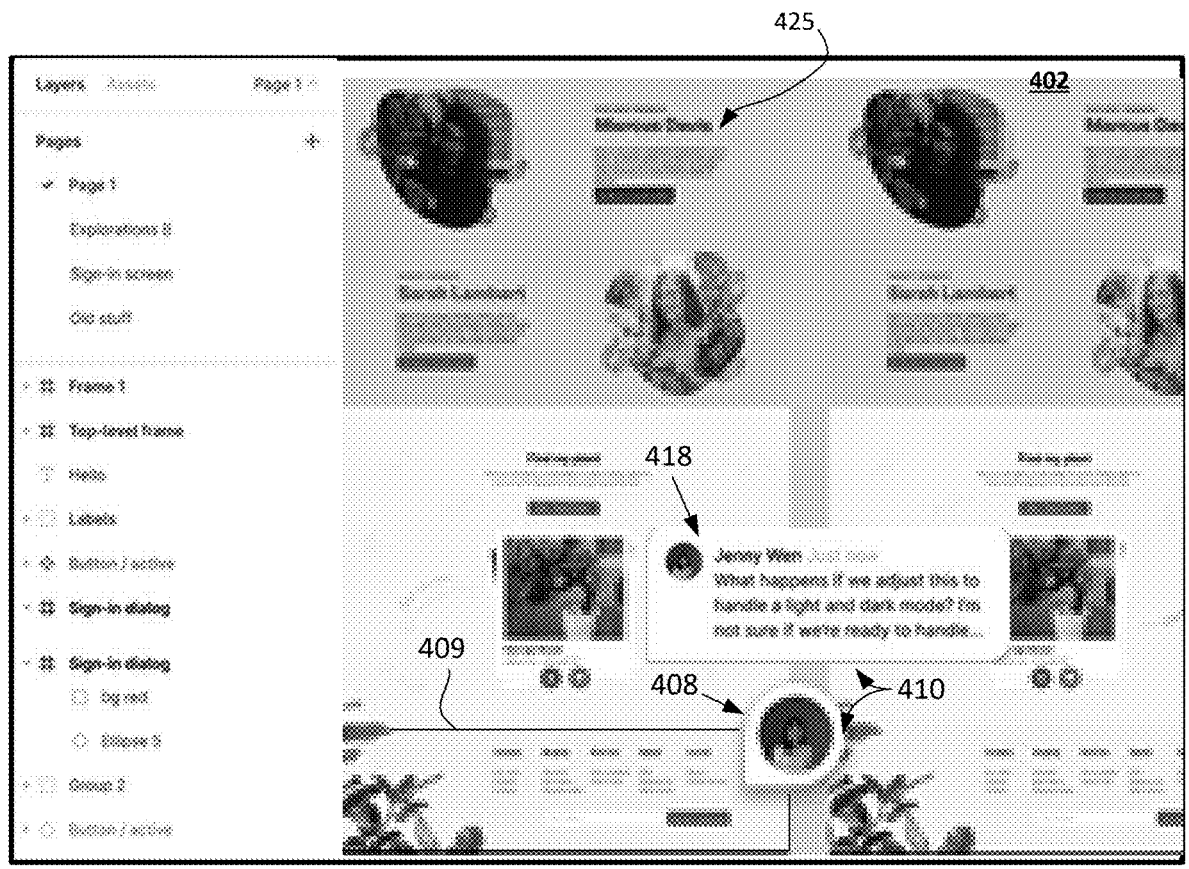

With reference to FIG. 4C, the interface 400 depicts the commenting feature 410 in an open state. In the open state, the comment body element 418 of the commenting feature 410 is rendered on the canvas 402, to enable the user to view and interact with a comment 419 carried by the comment body element 418. The pin component 408 can remain on the canvas 402, at the pin location (e.g., linked to the design element 409). Further, the pin component 408 can change state to reflect, for example, the comment body element 418 being viewed (or in a viewed state). The change in state can be reflected by the view state indicator 414, where for example, a coloring or sharing of a perimeter of the pin component 408 is changed.

Figure 4D:
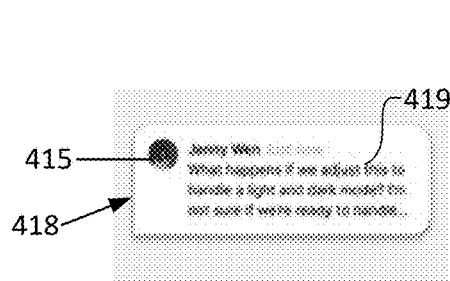

FIG. 4D illustrates an enlarged and isolated view of the commenting body element 418 of FIG. 4C. In FIG. 4D, the comment body element 418 includes a comment 419 from a single commentator, where the commentator is depicted by source identifier 415. In some variations, the comment body element 418 can include other interactive features, such as an input feature (not shown) to enable the user to provide input to mark resolution of an issue raised by the comment 419.

Figure 4E:
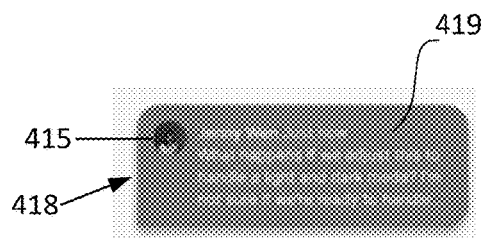

FIG. 4E illustrates a variation of the comment body element 418. In an example shown, the comment body element 418 can be colored or shaded to reflect an action where the user previews (rather than opens) the comment body element 418. When in the preview mode, the comment body element 418 renders a comment from a given user without adjusting a view state of the commenting feature 410. Further, in some variations, the comment body element 418 can render a preview of one or more comments without requiring the user to toggle into a comment entry mode.

Figure 4F:
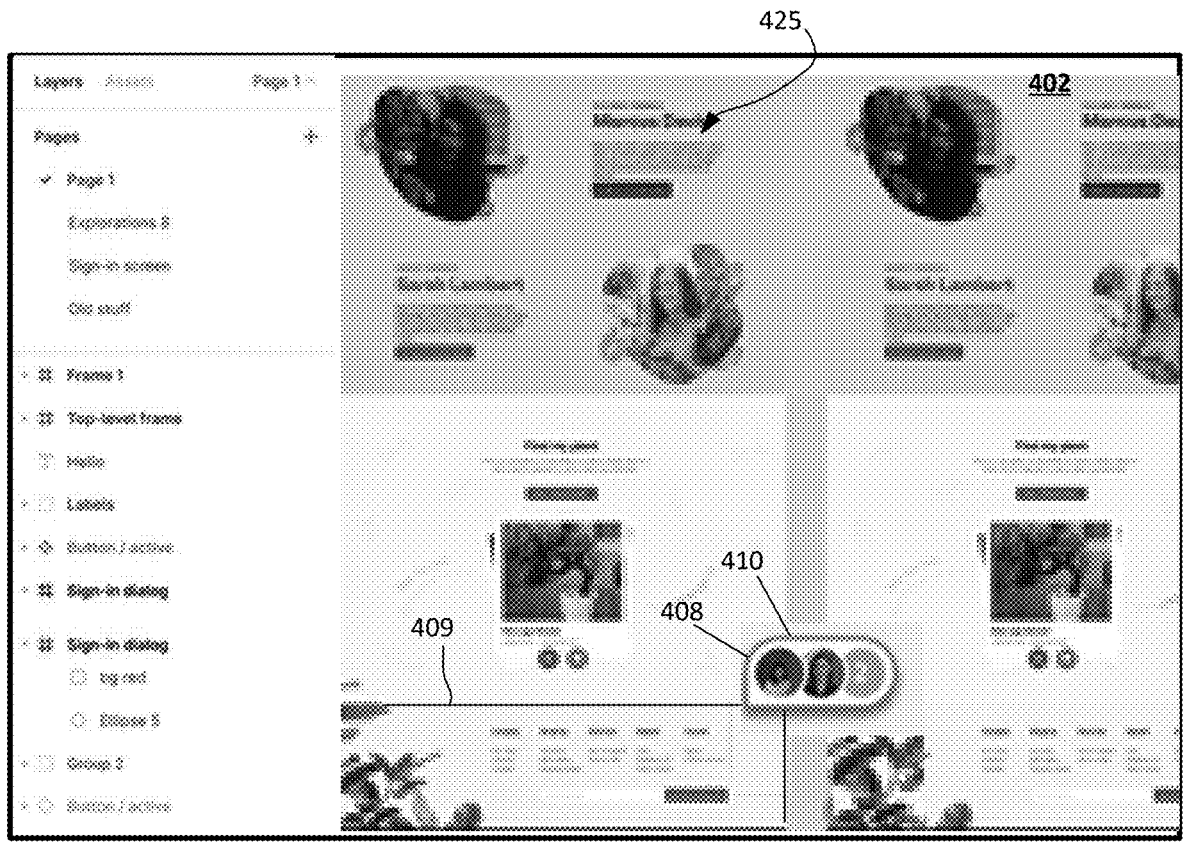
FIG. 4F through FIG. 4J illustrate an example interface on which a commenting feature is provided, where the commenting feature includes content provided by multiple collaborating users, according to one or more embodiments.

With reference to FIG. 4F, the interface 400 depicts an example in of the commenting feature 410 in a closed state, after the commenting feature 410 has been updated to include comments or other input from multiple users (e.g., four), according to one or more embodiments. In an example shown, the commenting feature 410 carries comments from multiple users of a collaborative session. In some examples, each user comment can be stored as part of a corresponding comment record 133, where each comment record 133 is associated with the canvas location. In examples, the canvas location corresponds to a coordinate (or range of coordinates, such as a region of the canvas 122) on the canvas. In variations, canvas location corresponds to a location of a design element. Alternatively, at least some of the comments indicated by commenting feature 410 can be combined into a given comment record 133.

The With further reference to FIG. 4F, the pin component 408 remains linked to the design element 409. Further, the pin component 408 can include data elements that identify some of the sources/authors who provided an input. The additional comments can also change one or more states associated with the commenting feature.

Figure 4G:
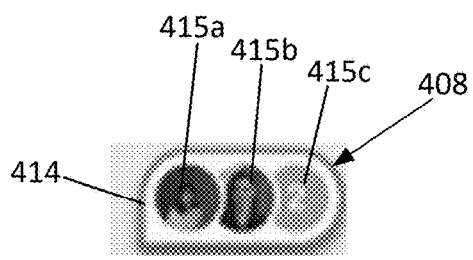

FIG. 4G illustrates an enlarged and isolated view of the pin component 408 of FIG. 4F. The pin component 408 can include one or more multiple source identifiers. In an example shown, the pin component 408 can include a first identifier 415a for a first source, a second identifier 415b for a second source (e.g., second commentator), and a number representing additional commentators 415c. Numerous variations may be possible, such as a number to display total number of commentators. Further, one or more state indicators 414 of the pin component 408 can change to reflect, for example, that a newly inserted comment is unread, or an issue presented with one or more new comments is unresolved.

Figure 4H:
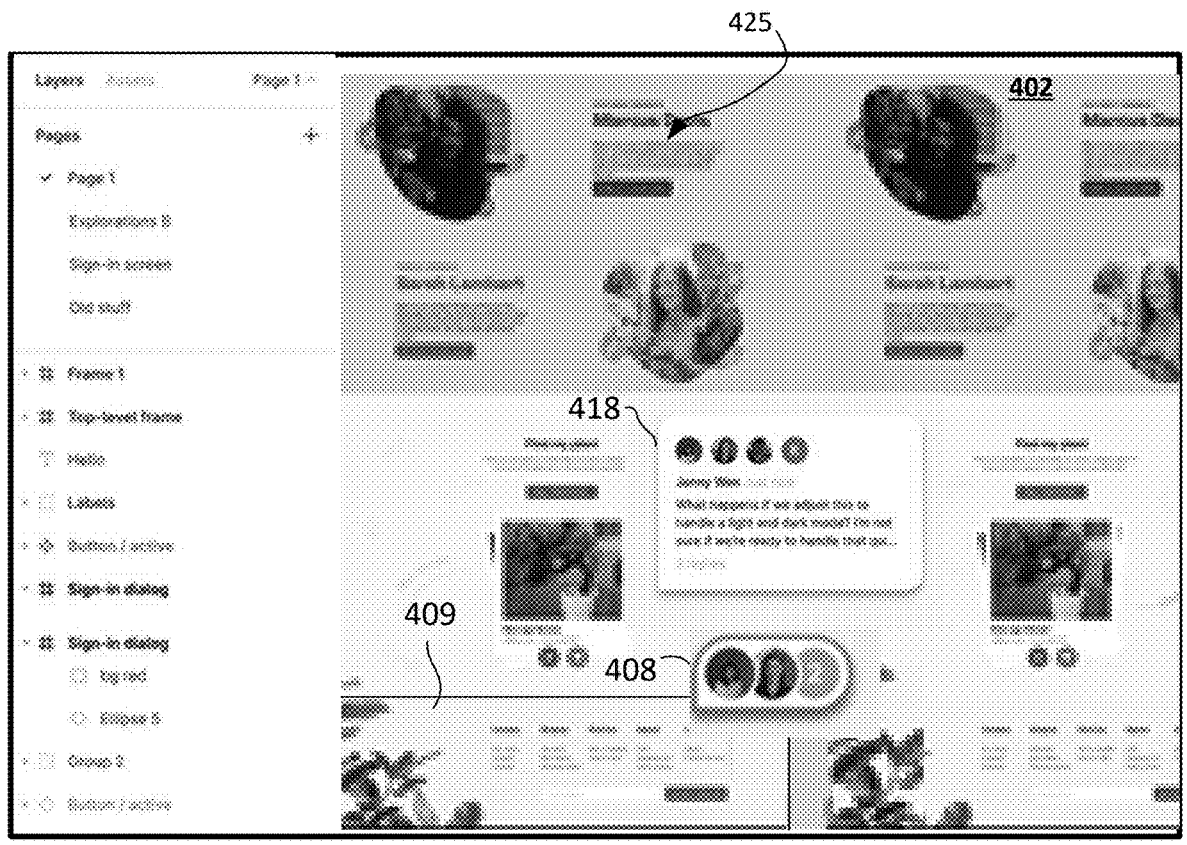

FIG. 4H illustrates the interface 400 with the commenting feature 410, as represented by FIG. 4F, in the open state. In the open state, the commenting body element 418 can be rendered in proximity or near to the pin component 408. The pin component 408 can be linked to the design element 409. In the open state, the commenting body element 418 can display comments from multiple users who collaborate on the graphic design 425. The commenting body element 418 can also provide an input interface to enable the user to interact with comments of other users, and to provide their own comment.

Figures 4I, 4J:
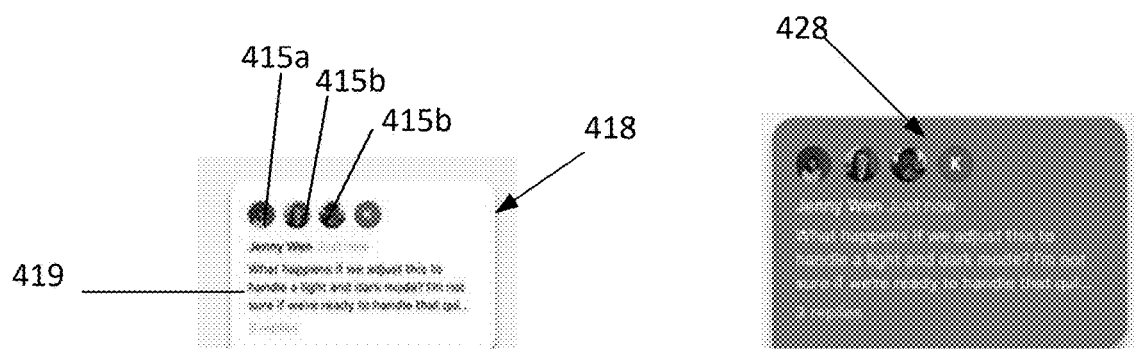
Figure 4K:
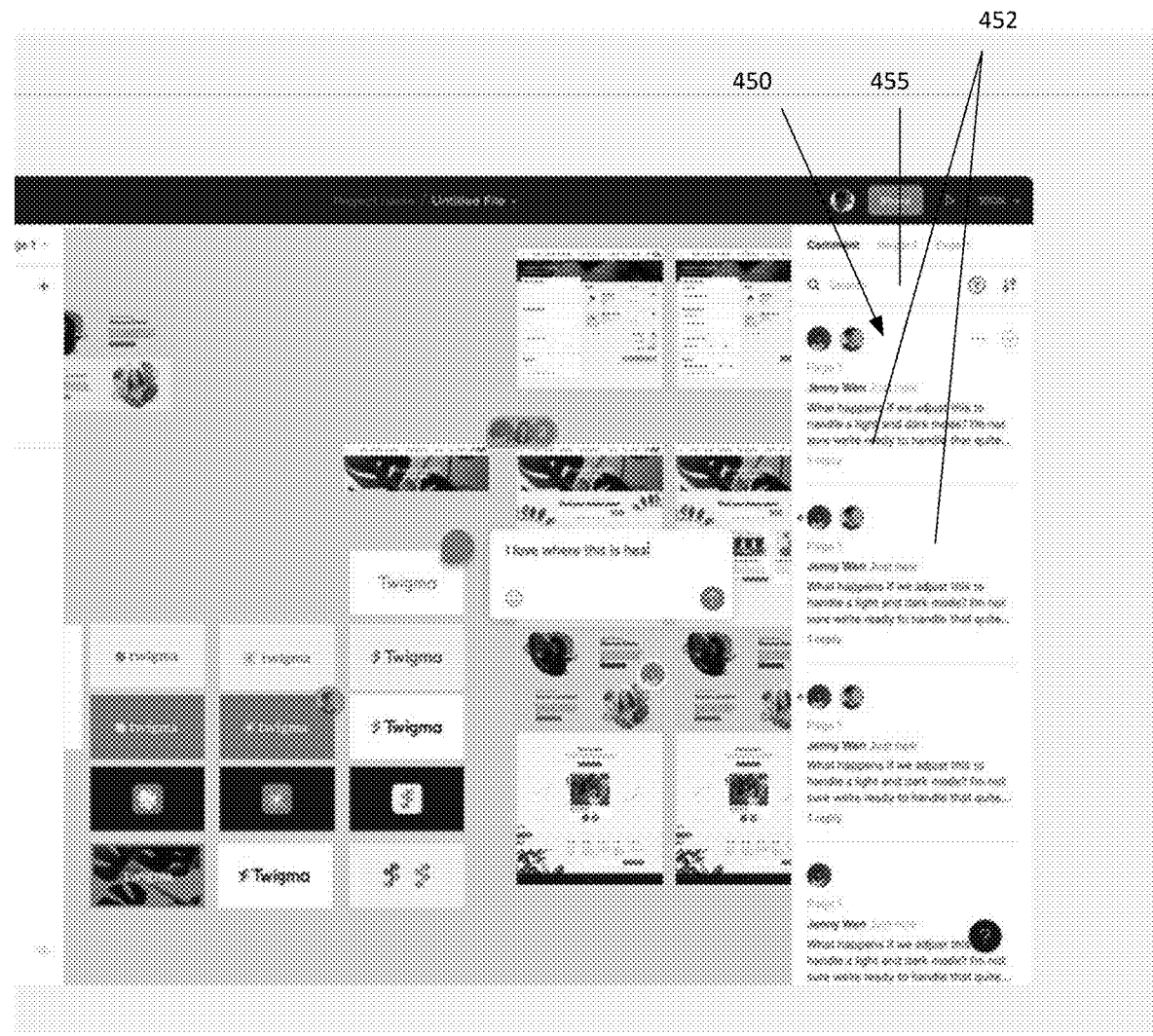
FIG. 4K illustrates an example clustering comment feature, according to one or more embodiments.
Figure 4L:
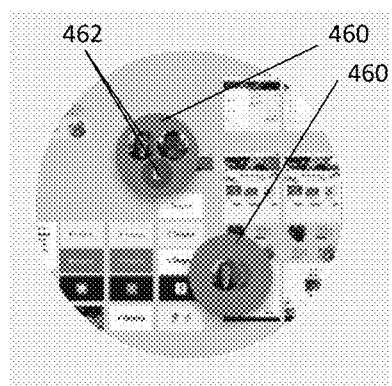
FIG. 4L illustrates an example comment sidebar which can be provided to render comments that appear in the canvas or in connection with the particular design, according to one or more embodiments.
Figure 4M:
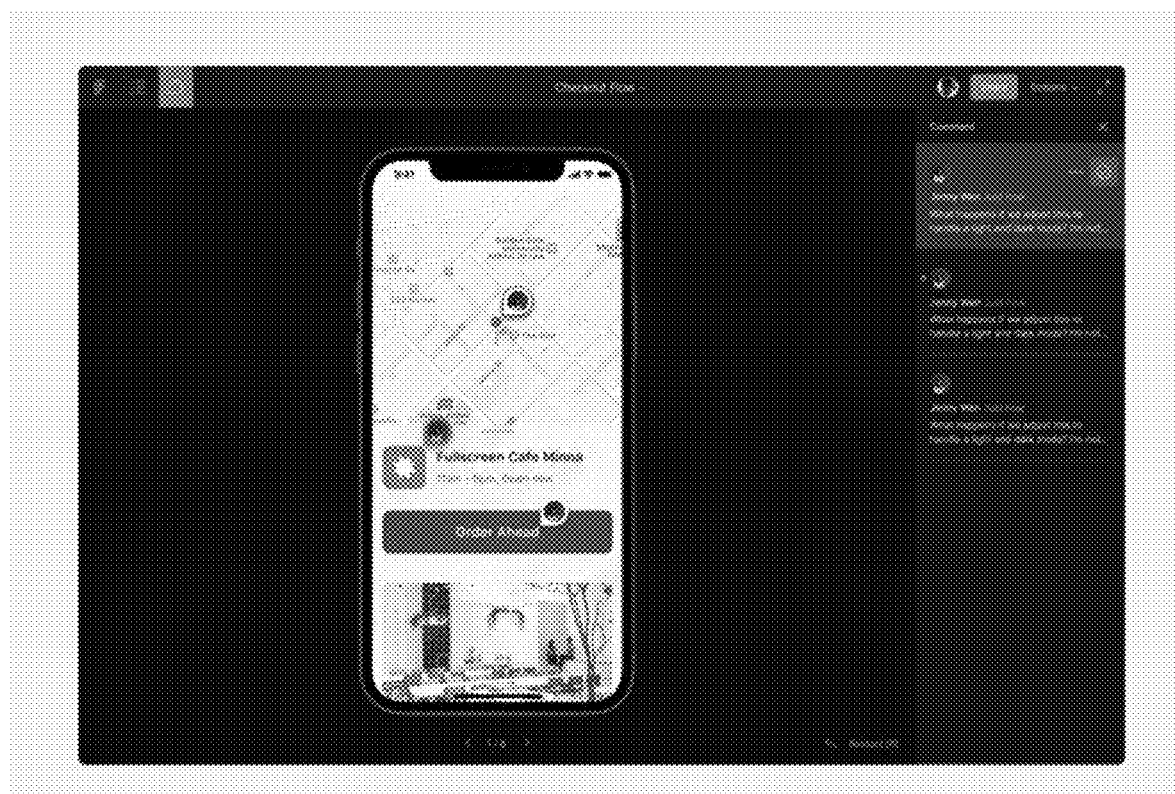
FIG. 4M illustrates an example simulation (or "prototype") rendering of a graphic design under edit, along with the comment side bar, according to one or more embodiments.

FIG. 4I illustrates an enlarged and isolated view of the commenting body element 418 in an open state, as shown in FIG. 4H. In FIG. 4I, the commenting body element 418 can include multiple comments 419 from different authors. Further, the source indicators 415a, 415b, 415c for the comments can be indicated by the commenting body element 418. In some variations, the commenting body element 418 can enable scrolling functionality that lets users review and interact with the comments of the commenting body element 418. the commenting body element 418 can, for example, provide interactive features to enable the user to dismiss (or accept, reject, etc.) issues raised by comments of other users. One viewed, the view indicator 414 of the pin component 408 can be altered or changed to reflect a change in the state of the commenting body element 418, to reflect, for example, the state of the commenting feature 410 as being read.

FIG. 4J illustrates a variation of the commenting body element 418 in a preview state. In the preview state, the user can view, for example, one or more of the comments 419 of the comment body element 418. When the commenting body element 418 is previewed, the view state indicator 414 of the 408 can remain unchanged to, for example, reflect an unread state.

With reference to FIG. 4C, FIG. 4F and FIG. 4H, the comment body element 418 can be moved over the canvas 402 to enable the user to view the comments 419 and work on specific aspects of the graphic design 425 at the same time. In this way, the comment body element 418 can enable the user to use a single field of vision, directed at the canvas, to implement feedback from the comment 419 of the commenting feature, with respect to specific aspects of the graphic design 425.

FIG. 4K illustrates a comment sidebar 450 which can be provided to render comments that appear in the canvas or in connection with the particular design, according to one or more embodiments. Each sidebar comment 452 can link to, or be representative of a commenting feature 430, where the corresponding commenting feature 430 may be rendered or renderable on the canvas 402 with a corresponding comment component 412 or comment body element 418. In some examples, the comment sidebar 450 can be displayed when the rendering engine 120 is operated in the comment entry mode. The comment sidebar 450 can include search and filter features 455 to enable a user to search for comments by, for example, keyword, source or author, metadata (timestamp) or other identifiers of individual comments.

FIG. 4L illustrates an implementation in which the commenting component 300 generates a clustering feature 460 in place of multiple commenting features, according to one or more embodiments. In examples, the pin locations of the commenting features 410 (see FIG. 4A through FIG. 4L) overlap in display location (based on the respective pin locations), based on the zoom factor of the respective user computing device. When the display distance of the pin locations is less than a threshold, the multiple commenting features can be deemed to overlap. The commenting features 410 can be rendered to appear as one clustered commenting feature 460. The clustered commenting feature 460 can include a pin location that is based on the pin locations of the constituent commenting features 435. Further, the cluster commenting feature 460 can include state information, source information and/or other indicators that indicate information about the constituent commenting features, including the sources for the individual commenting features. The source information for individual comment (or corresponding comment record) for the rendered commenting features 410. Similarly, when graphic design 425 is subject to a zoom (magnification) operation, the clustered commenting feature 460 can be separated out into multiple commenting features, such as described with FIG. 4A through FIG. 4J.

FIG. 4M illustrates a simulation (or "prototype") rendering of a graphic design under edit, along with the comment side bar, according to one or more embodiments. As shown, the comment sidebar can be provided in connection with a prototype rendering of the design under edit, to enable users to view comments along with features of the graphic design that is being simulated. The sidebar comments can be hidden or displayed, depending on implementation and setting.

Figure 4N:
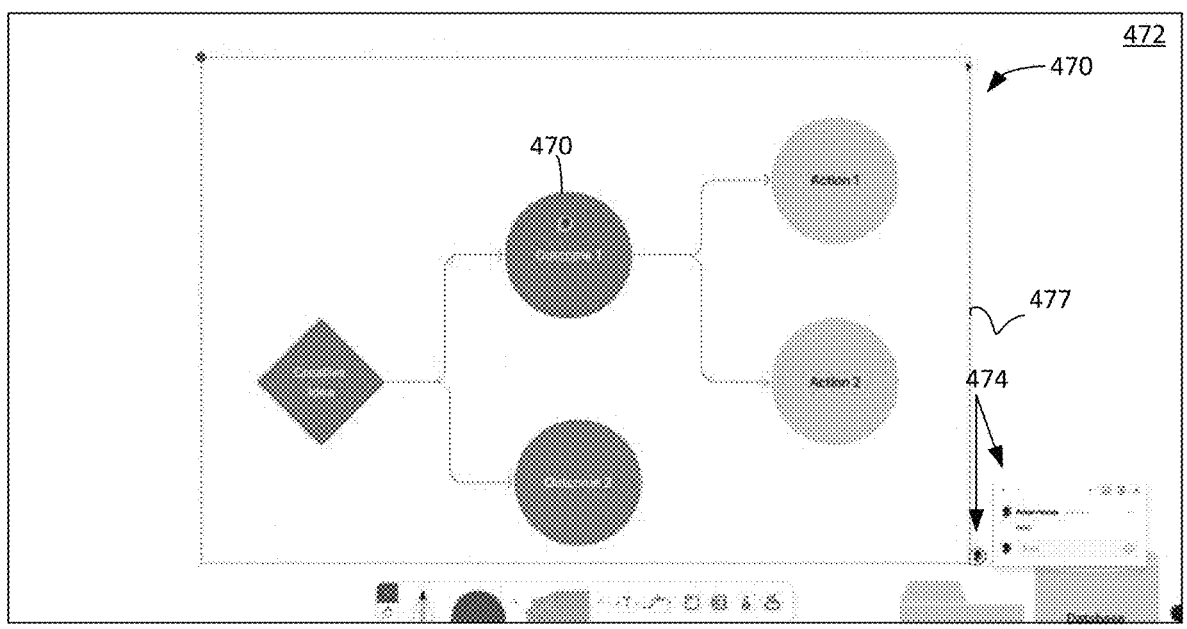
FIG. 4N illustrates an example interface on which a commenting feature is provided, according to one or more embodiments.

FIG. 4N illustrates another example interface on which commenting features are provided, according to one or more embodiments. In FIG. 4N, a graphic design 470 is rendered on a canvas 472. A user can use the commenting component 300 to create a commenting feature 474 at a first pin location, where the first pin location is associated with a design element 475. As an addition or alternative, the user can drag (or provide other input) the commenting feature 474 over a region 477 of the canvas 472. Once dragged, the commenting feature 474 is associated with the region 477. In an example shown, the commenting feature 474 can be associated with the design element 475 and the region 477. In some implementations, the commenting feature 474 is copied so as to have two pin locations, corresponding to locations of the graphic element 475 and also the canvas region 477. As another addition or variation, the user can select the region 477, and associate the commenting feature to the region 477.

Network Computer System

Figure 5:
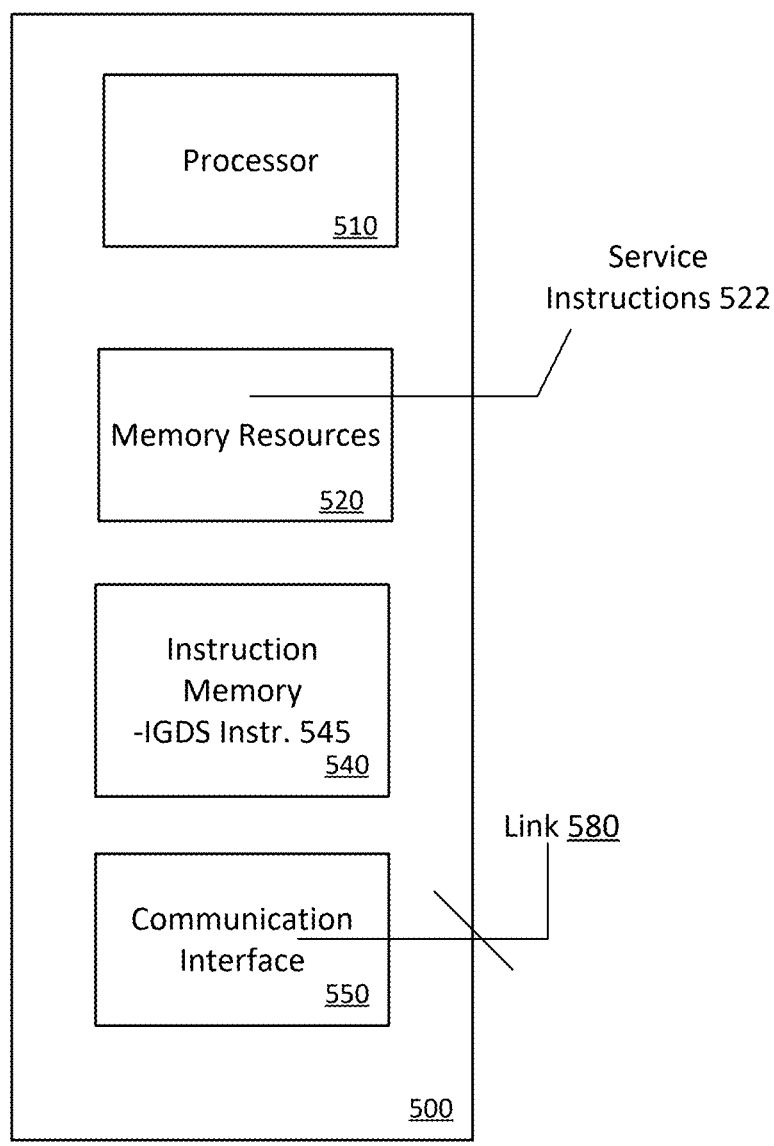
FIG. 5 illustrates a computer system on which one or more embodiments can be implemented.

FIG. 5 illustrates a computer system on which one or more embodiments can be implemented. A computer system 500 can be implemented on, for example, a server or combination of servers. For example, the computer system 500 may be implemented as the network computing system 150 of FIG. 1A through FIG. 1C, and further utilized by a plugin management system 200 of FIG. 2.

In one implementation, the computer system 500 includes processing resources 510, memory resources 520 (e.g., read-only memory (ROM) or random-access memory (RAM)), one or more instruction memory resources 540, and a communication interface 550. The computer system 500 includes at least one processor 510 for processing information stored with the memory resources 520, such as provided by a random-access memory (RAM) or other dynamic storage device, for storing information and instructions which are executable by the processor 510. The memory resources 520 may also be used to store temporary variables or other intermediate information during execution of instructions to be executed by the processor 510.

The communication interface 550 enables the computer system 500 to communicate with one or more user computing devices, over one or more networks (e.g., cellular network) through use of the network link 580 (wireless or a wire). Using the network link 580, the computer system 500 can communicate with one or more computing devices, specialized devices and modules, and/or one or more servers.

In examples, the processor 510 may execute service instructions 522, stored with the memory resources 520, in order to enable the network computing system to implement the network service 152 and operate as the network computing system 150 in examples such as described with FIG. 1A through FIG. 1C.

The computer system 500 may also include additional memory resources ("instruction memory 540") for storing executable instruction sets ("IGDS instructions 545") which are embedded with web-pages and other web resources, to enable user computing devices to implement functionality such as described with the IGDS 100.

As such, examples described herein are related to the use of the computer system 500 for implementing the techniques described herein. According to an aspect, techniques are performed by the computer system 500 in response to the processor 510 executing one or more sequences of one or more instructions contained in the memory 520. Such instructions may be read into the memory 520 from another machine-readable medium. Execution of the sequences of instructions contained in the memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

User Computing Device

Figure 6:
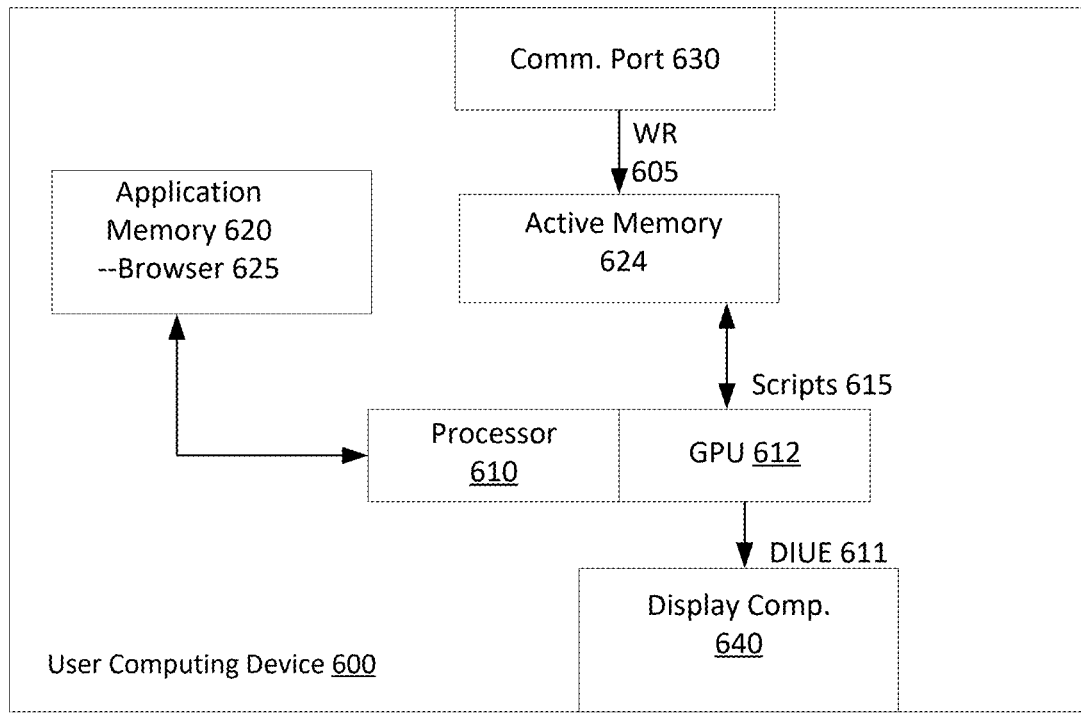
FIG. 6 illustrates a user computing device for use with one or more examples, as described.

FIG. 6 illustrates a user computing device for use with one or more examples, as described. In examples, a user computing device 600 can correspond to, for example, a workstation, a desktop computer, a laptop or other computer system having graphics processing capabilities that are suitable for enabling renderings of design interfaces and graphic design work. In variations, the user computing device 600 can correspond to a mobile computing device, such as a smartphone, tablet computer, laptop computer, VR or AR headset device, and the like.

In examples, the computing device 600 includes a central or main processor 610, a graphics processing unit 612, memory resources 620, and one or more communication ports 630. The computing device 600 can use the main processor 610 and the memory resources 620 to store and launch a browser 625 or other web-based application. A user can operate the browser 625 to access a network site of the network service 152, using the communication port 630, where one or more web pages or other resources 605 for the network service 152 (see FIG. 1A through FIG. 1C and FIG. 2) can be downloaded. The web resources 605 can be stored in the active memory 624 (cache).

As described by various examples, the processor 610 can detect and execute scripts and other logic which are embedded in the web resource in order to implement the IGDS 100 (see FIG. 1A through FIG. 1C). In some of the examples, some of the scripts 615 which are embedded with the web resources 605 can include GPU accelerated logic that is executed directly by the GPU 612. The main processor 610 and the GPU can combine to render a design interface under edit ("DIUE 611") on a display component 640. The rendered design interface can include web content from the browser 625, as well as design interface content and functional elements generated by scripts and other logic embedded with the web resource 605. By including scripts 615 that are directly executable on the GPU 612, the logic embedded with the web resource 605 can better execute the IGDS 100, as described with various examples.

CONCLUSION

Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A network computer system comprising:
a memory sub-system to store a set of instructions;
one or more processors are operable to communicate the set of instructions to one or more user devices, wherein the set of instructions include instructions that when executed by each of the one or more devices, causes the one or more devices to perform operations that include:
generating one or more commenting features that are rendered on a canvas that includes a graphic design, each commenting feature carrying at least one comment from a given source, and each commenting feature including a pin component and a comment body element;
associating the pin component of each commenting feature with a corresponding location on the canvas;
rendering the comment body element over the canvas in interactive form, including enabling a user to provide input to the comment body element regarding the graphic design, while enabling the user to provide input to update the graphic design; and
enabling the user to vary a zoom level of a view of the graphic design and the commenting feature, while maintaining the association of the pin component with the corresponding location on the canvas.

2. The network computer system of claim 1, wherein the corresponding location on the canvas corresponds to a design element of the graphic design.

3. The network computer system of claim 1, wherein the corresponding location on the canvas corresponds to a region of the canvas, as specified by a user input.

4. The network computer system of claim 1, wherein the corresponding location on the canvas is a coordinate of the canvas.

5. The network computer system of claim 1, wherein the operations include enabling the user to move the comment body element about at least a region of the canvas to view the at least one comment from the given source, while rendering the pin component to coincide with the corresponding associated location of the canvas.

6. The network computer system of claim 1, wherein the comment body element of each commenting feature is renderable in one of multiple states, including a viewed state and an unviewed state.

7. The network computer system of claim 1, wherein the comment body element of each commenting feature is movable about at least the region of the canvas.

8. The network computer system of claim 1, wherein the pin component of each commenting feature provides a visual indicator of a source of at least one comment provided in the comment body element.

9. The network computer system of claim 8, wherein the visual indicator includes an image of a user that created the at least one comment provided in the comment body element.

10. The network computer system of claim 1, wherein the one or more commenting features include at least a first commenting feature that carries comments from multiple sources, and wherein the comment body element of the first commenting feature is renderable to enable each of the multiple comments to be viewed.

11. A non-transitory computer-readable medium that stores instructions, which when executed by one or more processors of a computer system, cause the computer system to perform operations that include:
generating one or more commenting features that are rendered on a canvas that includes a graphic design, each commenting feature carrying at least one comment from a given source, and each commenting feature including a pin component and a comment body element;
associating the pin component of each commenting feature with a corresponding location on the canvas; and
rendering the comment body element over the canvas in interactive form, including enabling a user to provide input to the comment body element regarding the graphic design, while enabling the user to provide input to update the graphic design,
enabling the user to vary a zoom level of a view of the graphic design and the commenting feature, while maintaining the association of the pin component with the corresponding location on the canvas.

12. The non-transitory computer-readable medium of claim 11, wherein the corresponding location on the canvas corresponds to a design element of the graphic design.

13. The non-transitory computer-readable medium of claim 11, wherein the corresponding location on the canvas corresponds to a region of the canvas, as specified by a user input.

14. The non-transitory computer-readable medium of claim 11, wherein the corresponding location on the canvas is a coordinate of the canvas.

15. The non-transitory computer-readable medium of claim 11, wherein the operations include enabling the user to move the comment body element about at least a region of the canvas to view the at least one comment from the given source, while rendering the pin component to coincide with the corresponding associated location of the canvas.

16. The non-transitory computer-readable medium of claim 11, wherein the comment body element of each commenting feature is renderable in one of multiple states, including a viewed state and an unviewed state.

17. The non-transitory computer-readable medium of claim 11, wherein the comment body element of each commenting feature is movable about at least the region of the canvas.

18. The non-transitory computer-readable medium of claim 11, wherein the pin component of each commenting feature provides a visual indicator of a source of at least one comment provided in the comment body element.

19. The non-transitory computer-readable medium of claim 18, wherein the visual indicator includes an image of a user that created the at least one comment provided in the comment body.

20. A computer-implemented method for operating a network computer system, the method being implemented by one or more processors and comprising:
generating one or more commenting features on a canvas, each commenting feature carrying at least one comment from a given source, and each commenting feature including a pin component and a comment body element;
associating the pin component of each commenting feature with a corresponding location on the canvas;

rendering the comment body element over the canvas in interactive form, including enabling a user to provide input to the comment body element regarding a graphic design, while enabling the user to move the comment body element about at least a region of the canvas to view the at least one comment from the given source; and enabling the user to vary a zoom level of a view of the graphic design and the commenting feature, while maintaining the association of the location of the pin component with the corresponding location on the canvas.

* * * * *